United States Patent
Mikoshiba

(10) Patent No.: US 8,067,081 B2
(45) Date of Patent: Nov. 29, 2011

(54) SCREEN, PROJECTION SYSTEM, FRONT PROJECTION TELEVISION RECEIVER, AND SCREEN MANUFACTURING METHOD

(75) Inventor: Toshiaki Mikoshiba, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/791,282

(22) Filed: Jun. 1, 2010

(65) Prior Publication Data

US 2010/0321592 A1    Dec. 23, 2010

(30) Foreign Application Priority Data

Jun. 18, 2009  (JP) ................................ 2009-145045
Mar. 19, 2010  (JP) ................................ 2010-064037

(51) Int. Cl.
*B32B 3/00*     (2006.01)
*G03B 21/60*    (2006.01)

(52) U.S. Cl. .......................... 428/156; 359/321; 359/454

(58) Field of Classification Search .................. 359/443, 359/449, 451, 454–456, 459–460; 349/256; 372/24

See application file for complete search history.

(56) References Cited

U.S. PATENT DOCUMENTS

| | | | |
|---|---|---|---|
| 6,759,113 B1 * | 7/2004 | Tang | 428/156 |
| 7,113,333 B2 * | 9/2006 | Kamijima | 359/456 |
| 7,252,923 B2 | 8/2007 | Kobayashi | |
| 7,499,214 B2 * | 3/2009 | Novet et al. | 359/459 |
| 7,695,887 B2 | 4/2010 | Kobayashi | |

FOREIGN PATENT DOCUMENTS

| | | | |
|---|---|---|---|
| JP | 2003-195029 | | 7/2003 |
| JP | 2006-215162 | * | 8/2006 |
| JP |      215162 | * | 8/2006 |

OTHER PUBLICATIONS

Journal of Microelectromechanical Systems, vol. 17, No. 4, Aug. 2008 An Improved Process for Fabricating Microlens Array With High Fill Factor and Controllable Configuration Chingfu Tsou and Chienhung Lin.*

* cited by examiner

*Primary Examiner* — Clayton E Laballe
*Assistant Examiner* — Kevin Butler
(74) *Attorney, Agent, or Firm* — Harness, Dickey & Pierce, P.L.C.

(57) ABSTRACT

A screen includes: a reflection surface which reflects projection light, wherein a plurality of convexes are disposed on the reflection surface, and each of the convexes contains a spherical surface having a ¼ spherical shape, a curved surface having curvature larger than curvature of the spherical surface and disposed along an end of the spherical surface, and a cover surface having a flat surface shape and disposed at an end of the curved surface.

8 Claims, 14 Drawing Sheets

SCREEN, PROJECTION SYSTEM, FRONT PROJECTION TELEVISION RECEIVER, AND SCREEN MANUFACTURING METHOD

BACKGROUND

1. Technical Field

The present invention relates to a screen, a projection system, a front projection television receiver, and a screen manufacturing method.

2. Related Art

A reflection type screen which reflects projection light received from a projector or the like to show a visually recognizable image on the screen is known. Recently, such a reflection type screen which improves optical characteristics by using a number of micro-lenses (micro-lens array), that is, small semispherical convexes disposed on the reflection surface of the screen for reflecting the projection light has been proposed.

JP-A-2003-195029 proposes a technology which delivers ultraviolet hardening resin to a lyophilic area having a circular pattern, raises compositions of the resin on the lyophilic area by utilizing the wettability difference between the lyophilic area and other area (liquid repellency area), and hardens the raised resin to form semispherical convex micro-lenses.

In addition, JP-A-2006-215162, FIG. 2 discloses a technology which forms the shapes of the micro-lenses by ¼ spherical convexes as halves of the semispherical convexes.

According to the screen which has a number of small convexes or concaves on the reflection surface, the screen gain improves in the area directly receiving the projection light. However, substantially no improvement of the screen gain can be recognized in the area not directly receiving the projection light.

For example, when the projection light is diagonally supplied from below to the screen, an area not receiving the light exists in the upper portion of each lens in case of the micro-lenses having convexes. Also, an area not receiving the light exist in the lower portion of each lens in case of the micro-lenses having concaves. These portions scarcely contribute to the improvement of the screen gain.

Thus, according to the screen which includes the micro-lenses having the semispherical convexes on the reflection surface, the screen gain does not sufficiently increase, and the visibility of the image projected on the screen lowers.

For overcoming these problems, JP-A-2006-215162 proposes the structure which disposes the ¼ spherical convexes adjacent to each other in the incident direction of the projection light. According to this structure, the portion not contributing to the improvement of the screen gain decreases, while the portion contributing to the improvement of the screen gain increases.

In this case, however, the contrast lowers due to the effect of external light coming from a ceiling light or the like.

More specifically, when the projection light is diagonally supplied from below to the screen similarly to the above case, for example, the spherical surface of the ¼ spherical convex on which a reflection film is formed is disposed in the lower region, and the flat surface is disposed in the upper region. In this case, the flat surface not having the reflection film also has the reflection characteristics to some extent depending on the material. Thus, when external light is supplied from the ceiling light or the like to the screen, the external light is reflected by the flat surface. The reflection light then reaches the spherical surface of the convex disposed immediately above and is reflected thereby toward the front. As a result, the contrast lowers, and thus the visibility of the image projected on the screen decreases.

SUMMARY

It is an advantage of some aspects of the invention to provide a screen, a projection system, a front projection television receiver, and a screen manufacturing method capable of increasing visibility of a projected image.

A screen according to a first aspect of the invention includes a reflection surface which reflects projection light. A plurality of convexes are disposed on the reflection surface. Each of the convexes contains a spherical surface having a ¼ spherical shape, a curved surface having curvature larger than curvature of the spherical surface and disposed along an end of the spherical surface, and a cover surface having a flat surface shape and disposed at an end of the curved surface.

The spherical surface having the ¼ spherical shape refers to not only the ¼ spherical surface but also a shape close to the ¼ spherical shape. For example, the spherical shape includes a substantially ¼ spherical surface having a cross angle formed by two cross sections (cross sections in the radial directions) in the range from 80 degrees to 90 degrees, for example, as well as the cross angle of 90 degrees corresponding to the ¼ spherical shape. In addition, the spherical shape includes a substantially ¼ spherical surface having two sectorical cross sections whose center angle lies in the range from 120 degrees to 240 degrees, for example, as well as two semicircular cross sections corresponding to the ¼ spherical shape.

The cover surface having the flat surface shape is not limited to a complete flat shape but includes a shape slightly curved but considered as a flat surface on the whole.

The end of the spherical surface refers to an outer circumferential part of the cross section crossing the reflection surface as one of the two cross sections of the ¼ sphere. The end of the curved surface refers to an outer circumferential part on the side of the curved surface not connecting with the spherical surface. The cover surface is a surface continuously provided from the end of the curved surface and crossing the reflection surface.

According to this aspect of the invention, the curved surface having curvature larger than that of the spherical surface of the ¼ spherical shape is provided along the end of the spherical surface, and the cover surface having the flat surface shape is provided along the end of the curved surface. Thus, each entire size of the convexes becomes smaller than the size of a semispherical convex which has a semispherical surface having the same curvature as that of the ¼ spherical surface.

Thus, a larger number of the convexes according to this aspect of the invention than that of the semicircular convexes can be provided in the same area. When projection light is supplied to the screen in a diagonal direction, light reaches the light entrance side surface of the semispherical convex with respect to the vertex but cannot reach the opposite side as the shaded side. That is, the portion of the semispherical convex which can reflect light is only approximately the ¼ spherical portion, which is substantially the same area as that of the spherical surface of the convex according to this aspect of the invention.

Thus, the entire size of the convex according to this aspect of the invention can be reduced while providing the same area of the part of the spherical surface for reflecting light as that area of the semispherical convex having the same curvature. In this case, a larger number of the convexes according to this aspect of the invention than that of the semispherical convexes can be provided within the screen having the same area. Accordingly, the reflection area of the entire screen can be increased, and thus the screen gain can be considerably improved.

According to this aspect of the invention, the screen needs to be disposed such that light can be applied to the spherical surfaces of the convexes. In this case, the projection light having reached the reflection surface can be efficiently reflected by the spherical surfaces toward the front of the screen similarly to the semispherical convexes. Thus, the screen is particularly suited for a close projection type projector.

According to this aspect of the invention, the curved surface is provided along the end of the spherical surface. Thus, external light supplied in a direction different from the incident direction of the projection light is reflected and diffused by the curved surface. In this case, the reflected external light does not reach the spherical surface of another adjoining convex in the incident direction of the external light to be reflected toward the front of the screen, and thus the contrast of images can be enhanced.

Accordingly, the screen gain and the image contrast can be improved, and thus visibility of the images projected on the screen can be increased.

When projection light is diagonally supplied from below in the front central region of the screen toward the screen, for example, the screen is disposed such that the spherical surfaces of the respective convexes face downward in the vertical direction. The projection light having reached the spherical surfaces can be reflected by the spherical surfaces toward the front of the screen in a well-balanced manner.

In this case, the curved surfaces are directed upward. The screen receives external light as well as projection light. External light supplied from a ceiling light or the like from above the screen has great effect on the characteristics of the screen. When the curved surfaces are not provided, the external light supplied from above is reflected by the cover surfaces. Then, the reflected light reaches the spherical surface of the convex positioned immediately above and is further reflected toward the front. According to this aspect of the invention, however, the curved surfaces facing upward are provided, and thus the external light supplied from above is reflected and diffused by the curved surfaces. Accordingly, further reflection of the reflected external light by the spherical surface of the convex immediately above can be prevented, and thus the contrast can be enhanced.

According to the screen of the above aspect of the invention, it is preferable that a reflection film having higher light reflection characteristics than light reflection characteristics of the spherical surface is provided on each of the spherical surfaces.

The reflection film is formed on the spherical surface of the substrate of the screen having the convex by deposition or other methods. That is, the reflection film is laminated on the spherical surface of the convex.

By providing the reflection film on the spherical surface of the convex, the characteristics for reflecting light having reached the spherical surface can be increased, and thus the screen gain can be further improved.

Moreover, the convex need not to have reflection characteristics, and thus the degree of freedom for selecting the material of the substrate of the screen can be raised.

According to the screen of the above aspect of the invention, it is preferable that the convexes project from a flat surface extending along the reflection surface. When a point A as a cross point of the spherical surface and the flat surface, a point B as a cross point of the spherical surface and the curved surface, a point C as a cross point of the curved surface and the cover surface, a point D as a cross point of the cover surface and the flat surface, and a point O as the center point of the spherical surface are provided in a cross-sectional shape extending in a first direction where the spherical surface, the curved surface, and the cover surface of each of the convexes are disposed, crossing the flat surface at right angle, and passing the center of the convex in a second direction perpendicular to the first direction, a circular arc having a radius R between the points A and B, a circular arc having a radius R1 shorter than the radius R between the points B and C, a straight line between the points C and D, and a straight line passing the point O between the points D and A are formed.

When the first direction corresponds to the up-down direction along the reflection surface of the screen disposed in the vertical direction, the second direction corresponds to the horizontal direction along the reflection surface of the screen. In this case, the cross section becomes a vertical cross section which passes the center axis of the convex in the left-right direction (horizontal direction) and crosses the reflection surface at right angles.

The curvature of the spherical surface becomes $1/R$ as the inverse number of a radius R of the spherical surface, and the curvature of the curved surface becomes $1/R1$ as the inverse number of a radius R1 of the curved surface. Since $R>R1$, $1/R<1/R1$ holds. Thus, the curvature of the curved surface becomes larger than the curvature of the spherical surface.

According to this structure, the external light supplied from a direction different from the incident direction of the projection light is reflected and diffused by the curved surface. In this case, the reflected external light does not reach the spherical surface of another adjoining convex in the incident direction of the external light to be reflected toward the front of the screen, and thus the contrast of images can be enhanced. Accordingly, the screen gain and the image contrast can be improved, and thus visibility of the images projected on the screen can be increased.

The convex according to this aspect of the invention may have a three-dimensional shape sectioned by a locus produced by rotating the cross-sectional shape surrounded by the points A, B, C, and D around a rotation axis of a line segment A-D connecting the points A and D in the range of 180 degrees. In this case, the spherical surface is represented by the rotation locus of the circular arc between the points A and B. The curved surface is represented by the rotation locus of the circular arc between the points B and C. The cover surface is represented by the rotation locus of the straight line between the points C and D.

According to the screen of the above aspect of the invention, it is preferable that, when the distance between the points D and O is a distance L1, the distance L1 lies in the range from ¼ of the radius R to ½ of the radius R.

When the distance L1 is larger than ½ of the radius R, the entire size of the convex becomes close to the semispherical convex. In this case, the number of the convexes to be provided on the reflection surface decreases, and thus the screen gain lowers. On the other hand, when the distance L1 is ½ of the radius R or shorter as in this aspect of the invention, the entire size of the convex becomes smaller than that when the distance L1 is larger than ½ of the radius R. As a result, the entire size of the convex can be reduced, and thus the number of the convexes to be provided can be increased. Thus, the screen gain improves.

When the distance L1 is smaller than ¼ of the radius R, the entire shape of the convex becomes the substantially ¼ spherical shape. In this case, the area of the curved surface decreases. Thus, the external light other than the projection light is reflected not by the curved surface but by the cover surface, and the reflected light is further reflected by the spherical surface toward the front of the screen. As a result, the contrast of the projection image lowers. When the distance L1 is ¼ of the radius R or longer as in this aspect of the invention, the area of the curved surface becomes larger than that when the distance L1 is shorter than ¼ of the radius R. In this case, the external light diffused by the curved surface is not reflected toward the front of the screen. Thus, the contrast of the projection image does not lower.

According to the screen of the above aspect of the invention, it is preferable that, when the distance between each adjoining pair of the plural convexes disposed in the first direction is a distance L2, the distance L2 lies in the range from 0 to the distance L1.

The distance L2 of "0" indicates that the respective convexes are disposed without space in the first direction. Thus, the respective convexes are disposed at least with spaces of the distance L1 or shorter in the first direction.

When the distance L2 is the distance L1 or shorter, the distance L2 becomes ½R or shorter since the distance L1 is ½R or shorter. Thus, the respective convexes are disposed closer to each other than the semispherical convexes disposed without space. As a result, the number of the convexes increases, and thus the screen gain improves.

According to the screen of the above aspect of the invention, it is preferable that, when the first direction extends from the spherical surface of each of the convexes as the upstream side to the curved surface as the downstream side, the distance between each adjoining pair of the convexes disposed on the upstream side in the first direction is smaller than the distance between each adjoining pair of the convexes disposed on the downstream side in the first direction.

When light is supplied diagonally upward by the projector from a lower region of the screen, for example, the convexes are disposed in such a direction that the spherical surfaces face upward. Thus, the direction extending from the spherical surface to the curved surface of each of the convexes (the first direction) is an upward direction. In this case, the distance between each adjoining pair of the convexes disposed on the upstream side in the first direction, that is, the lower end side of the screen is shorter than the distance between each adjoining pair of the convexes disposed on the downstream side in the first direction, that is, the upper end side of the screen.

According to this structure, the incident angle of the projection light supplied to the screen reflection surface (the angle of the projection light with respect to the direction crossing the screen at right angles) is smaller on the screen lower end side and larger on the screen upper end.

When the incident angle is small, the projection light is projected on the screen from the front surface side. Thus, light is also applied to the spherical surface of the convex from the front surface side and is scarcely blocked by the adjoining convex. In this case, reduction of the spaces between the respective convexes is allowed. Accordingly, the reflection area increases, and thus the screen gain improves.

When the incident angle is large, the projection light is projected on the screen in an oblique direction. Thus, when the convexes are disposed close to each other, the light is blocked by the convexes. As a result, the area of the spherical surface for receiving the light decreases. Thus, the distance between the convexes is widened to increase the area of the spherical surface of the convex for receiving light. However, when the distance between the convexes is too long, the number of the convexes to be provided decreases. Thus, it is preferable that the distance L2 between the convexes is set at the distance L1 at a maximum.

It is preferable that the cross angle of the line segment A-O between the points A and O and the line segment B-O between the points B and O, that is, the angle <AOB lies in the range from 80 degrees to 90 degrees.

When the angle is smaller than 80 degrees, the area of the spherical surface decreases and affects the reflection characteristics of the spherical surface. When the angle is larger than 90 degrees, the position of the curved surface shifts and affects reflection of the external light by the curved surface.

It is preferable that the cross angle of the line segment O-B between the points O and B and the line segment B-C between the points B and C, that is, the cross angle <OBC lies in the range from 30 degrees to 50 degrees.

When the angle is smaller than 30 degrees, a large amount of the light reflected by the curved surface reaches the spherical surface of the adjoining convex disposed in the direction corresponding to the incident direction of the external light and affects the contrast. When the angle is larger than 50 degrees, a large amount of the light reflected by the curved surface is reflected toward the front of the reflection surface and affects the contrast.

It is preferable that the curved surface and the cover surface have light absorption characteristics.

By the function of the light absorption characteristics thus provided, reflection of the external light by the curved surface and the cover surface can be prevented. Thus, reflection of the external light by the adjoining convex can be more securely prevented, and the contrast can be further improved.

A projection system according to a second aspect of the invention includes: the screen described above; and a projector which projects light on the spherical surfaces of the convexes of the screen.

A front projection television receiver according to a third aspect of the invention includes: the screen described above; a projection unit which projects light on the spherical surfaces of the convexes of the screen; and a housing which accommodates the screen and the projection unit.

The projection system and the front projection television receiver according to these aspects of the invention include the screen described above. Thus, the advantages similar to those of the screen can be provided. Accordingly, the screen gain and the contrast can be improved, and the visibility of the projected images can be increased.

A method for manufacturing a screen which reflects projection light by a reflection surface according to a fourth aspect of the invention includes: forming a substrate which includes a convex containing a spherical surface having a ¼ spherical shape, a curved surface having curvature larger than curvature of the spherical surface and disposed along an end of the spherical surface, and a cover surface having a flat surface shape and disposed at an end of the curved surface; and forming a reflection film on the spherical surface of the convex to manufacture the screen.

According to the method for manufacturing the screen according to this aspect of the invention, the screen having the reflection film is manufactured. Thus, the screen gain and the image contrast can be improved, and the visibility of the projected images can be increased.

It is preferable that the method for manufacturing the screen according this aspect of the invention further includes: patterning a plurality of lyophilic areas and a liquid repellency area having liquid repellency relative to the lyophilic areas on a base board; applying resin liquid to the lyophilic areas and hardening the applied resin liquid to form convexes on the base board; and forming reflection films on a convex surface of the base board where the convexes are formed, or on a convex surface of the substrate produced by transferring a mold having concaves formed by transferring the base board to manufacture the screen. Each shape of the lyophilic areas becomes a semicircular shape by the patterning. The reflection film is provided on the spherical surface formed in correspondence with the semicircular shape.

According to the method of this aspect of the invention, the resin liquid is applied to the lyophilic areas surrounded by the liquid repellency area and hardened thereon. Thus, the convexes raised on the lyophilic areas and having the curved surfaces can be formed. Then, the screen is manufactured by using the base board having the convexes as the substrate or by using the substrate produced by transferring the mold having the concaves produced by transferring the base board. Thus, the convexes having shapes other than semispherical shapes can be easily formed on the reflection surface of the screen in accordance with the shapes of the lyophilic areas.

Since the lyophilic areas have semicircular shapes in the patterning step, the convexes raised on the semicircular lyophilic areas and having the spherical surfaces can be easily formed.

Since the reflection film is formed on the spherical surface formed in accordance with the semicircular shape in the screen manufacturing step, the spherical surface obtains light reflection characteristics.

Accordingly, the screen which has convexes shaped similarly to those of the above screen can be easily manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

A screen and a screen manufacturing method according to exemplary embodiments of the invention are hereinafter sequentially described.

The screen according to the invention includes a plurality of convexes on a reflection surface for reflecting projection light. Each of the convexes has a spherical surface, a curved surface, and a cover surface. The spherical surface reflects projection light supplied from a projector toward the front of the reflection surface, and the curved surface reflects and diffuses external light coming from a ceiling light or the like other than the projection light.

On the other hand, the screen manufacturing method according to the invention produces lyophilic areas and liquid repellency areas having predetermined patterns on a base board by patterning, applies resin liquid to the lyophilic areas, and hardens the resin liquid raised on the lyophilic areas to form convexes having shapes other than semispherical shapes and similar to the convexes provided on the screen according to the embodiments of the invention.

1. First Embodiment of the Invention

A screen and a manufacturing method of the screen according to a first embodiment of the invention are now sequentially described with reference to the drawings. In the respective figures, the reduction scale is varied for each constituent element as necessary such that the constituent element has a sufficient size to be recognized on the figures.

1-1. Screen

Figure 1:
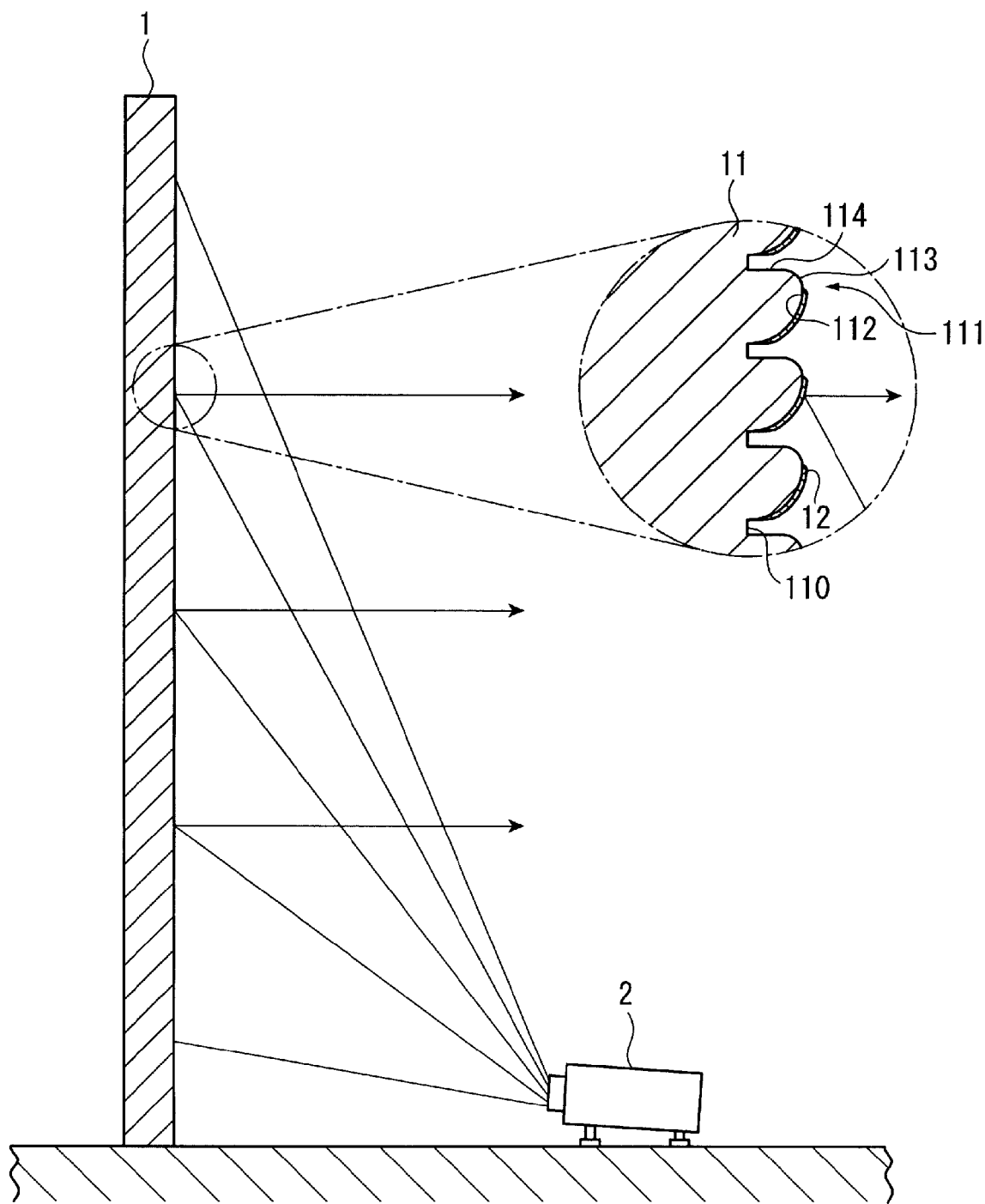
FIG. 1 illustrates the structure of an image projection system according to a first embodiment of the invention.

FIG. 1 illustrates an image projection system including the screen according to the first embodiment. An enlarged part in FIG. 1 shows a cross-sectional shape of the screen.

The image projection system includes a screen 1 and a projector 2. The screen 1 is a reflection-type screen which reflects projection light projected from the projector 2 to show a visually recognizable image to an observer. The projector 2 is a close projection type projector which requires only a short distance between the screen 1 and the projector 2 (such as about 60 cm for the projection distance).

1-1-1. Structure of Screen

The screen 1 includes a substrate 11, and reflection films 12 formed on the substrate 11. The surface on which the reflection films 12 are formed corresponds to a reflection surface of the screen 1 on which an image is displayed.

The material of the substrate 11 may be any material as long as it is generally used as the substrate of the screen 1. The specific examples of the material include various resin materials such as ultraviolet hardening resin, silicon rubber, and others. The thickness of the substrate 11 is determined in accordance with the types of the substrate material and the screen 1.

The reflection surface of the substrate 11 has a number of small convexes 111. Each shape of the convexes 111 is now discussed in detail. According to a reflection-type screen which includes micro-lenses constituted by small convexes on a substrate in related art, all of the convexes have semispherical shapes in view of difficulty in manufacture and the like. According to this embodiment, however, the convexes 111 have the following structure.

In this embodiment, the projection light diagonally supplied to the reflection surface from the projector 2 located at a lower position in the vertical direction is reflected by the reflection surface toward the front. External light having great effect on the characteristics of the screen is chiefly supplied from above to the reflection surface. The external light herein refers to illumination from a lighting device provided on the ceiling. Generally, the illumination is not located at a position extremely close to the screen such as a position immediately above the screen under the installment environment of the screen. On the other hand, an illumination disposed at a long distance from the screen does not have great effect on the screen. Thus, in case of an illumination provided above the screen such as an illumination on the ceiling, external light having an incident angle approximately in the range from 30 to 60 degrees easily affects the characteristics of the screen. Accordingly, the convexes 111 are structured in accordance with these incident directions.

Figure 2:
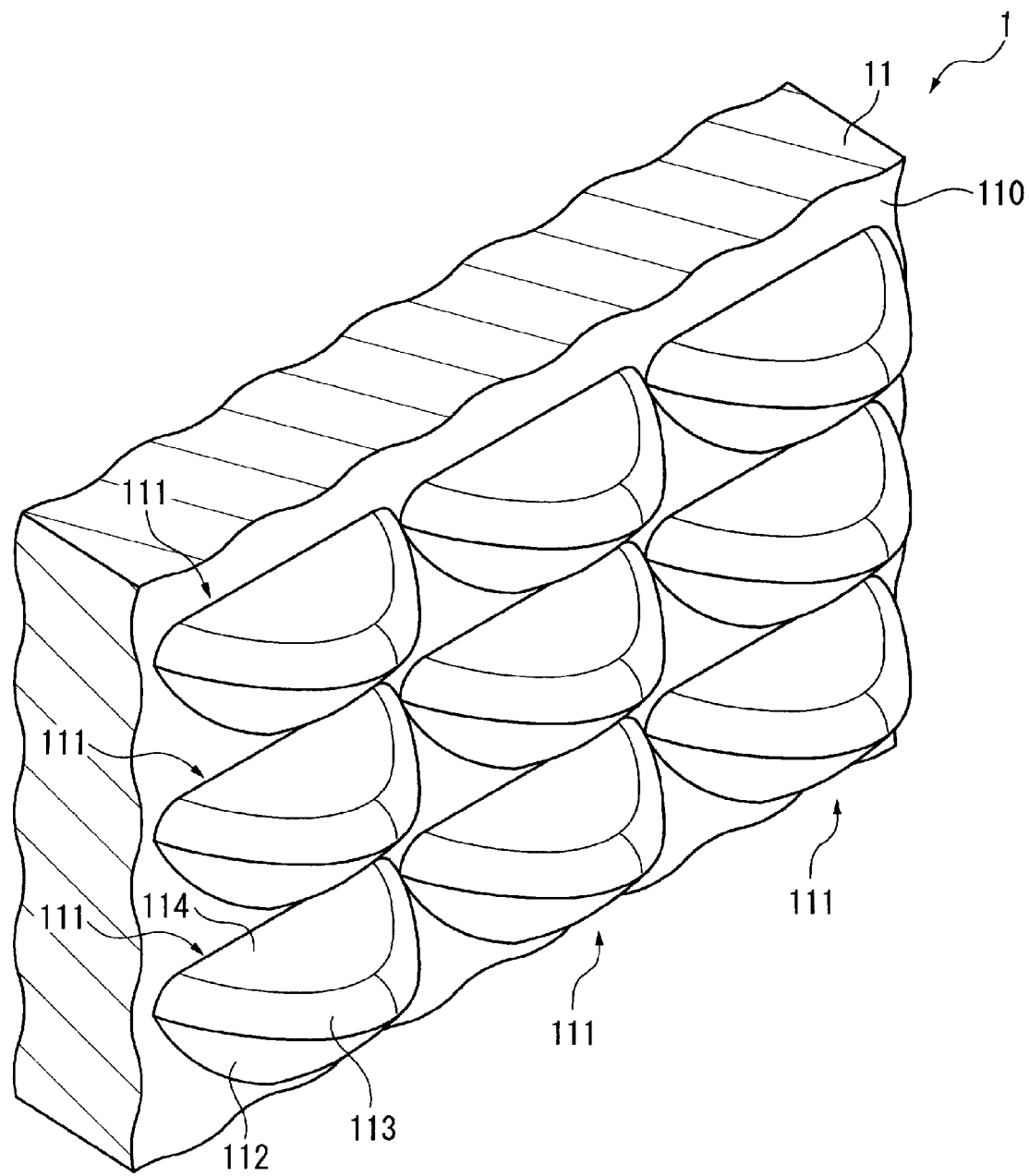
FIG. 2 is a perspective view illustrating a part of a reflection surface of a screen.
Figure 3:
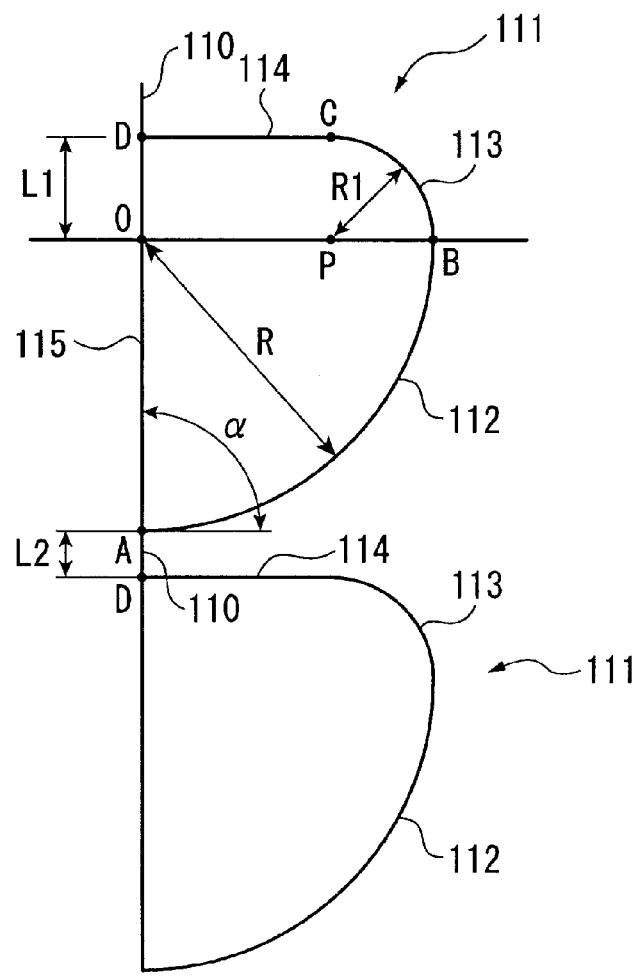
FIG. 3 illustrates a cross-sectional shape illustrating the central portion of a convex shape on the reflection surface.
Figure 4:
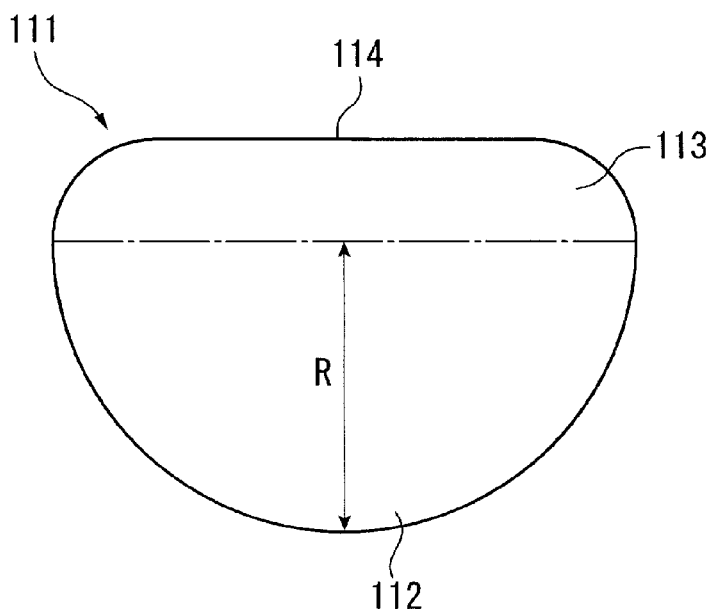
FIG. 4 is a front view of the convex shape of the reflection surface.

FIG. 2 is a perspective view illustrating a part of the reflection surface of the screen 1. FIG. 3 is a cross-sectional view illustrating the central portion of each convex shape on the reflection surface. More specifically, FIG. 3 is a cross-sectional view taken along a line passing the center of the convex 111 in the left-right direction and crossing a flat surface 110 at right angles. FIG. 4 is a front view of each convex shape.

As illustrated in FIGS. 1 and 2, the convexes 111 project from the flat surface 110 of the reflection surface of the screen 1. In this embodiment, the flat surface 110 is a vertical surface.

As illustrated in FIGS. 2 through 4, each of the convexes 111 has a spherical surface 112 having a sphere radius R, a curved surface 113, and a cover surface 114.

The spherical surface 112 has an approximately ¼ spherical (an equal half of a semisphere) convex surface. The spherical surface 112 faces downward in the vertical direction such that the projection light diagonally supplied from below in the vertical direction can be reflected toward the front of the reflection surface. The sphere radius R is determined considering maintenance of resolution, productivity, and the like of the screen 1. For example, it is preferable that the sphere radius is 50 μm or larger and ¼ or smaller of the pixel size. When the sphere radius R is too small, the external appearance deteriorates due to generation of interference fringes. When the sphere radius R is too large, the image quality becomes rough depending on the projected screen size of the projector 2. It is preferable that the spherical surface 112 is constituted by a perfect spherical surface. However, the spherical surface 112 is not required to be a complete spherical surface in view of manufacture and the like.

When the projection light is diagonally supplied to the reflection surface from above in the vertical direction, the shape of the convex 111 may be disposed upside down in the up-down direction. When the projection light is supplied from the left in the horizontal direction, the spherical surface 112 and the curved surface 113 may be directed to the left and to the right in the horizontal direction, respectively. Similarly, when the projection light is supplied from the right in the horizontal direction, the spherical surface 112 and the curved surface 113 may be directed to the right and to the left in the horizontal direction, respectively. By this method, the spherical surface 112 can be directed in accordance with the incident direction of the projection light. The spherical surface 112 may be obliquely directed so as to receive projection in a diagonal direction as well as the vertical and horizontal directions.

When the reflection surface of the screen 1 is freely rotatable in such a manner that the spherical surface 112 can face in any one direction, the direction of the spherical surface 112 can be varied in accordance with the change of the projection direction of the projection light from the projector 2. For example, when projection from below in the vertical direction is switched to projection from above in the vertical direction, the screen 1 is rotated through 180 degrees to direct the spherical surface 112 upward in the vertical direction in accordance with the projection from above in the vertical direction.

The curved surface 113 of the convex shape is disposed along the upper end of the spherical surface 112. That is, the curved surface 113 extends upward from the upper end of the spherical surface 112.

The curvature of the curved surface 113 is larger than the curvature of the spherical surface 112. More specifically, when the radius of curvature of the spherical surface 112 is R, the curvature of the spherical surface 112 becomes 1/R as the inverse number of the radius of curvature R. When the radius of curvature of the curved surface 113 is R1, the curvature of the curved surface 113 becomes 1/R1 as the inverse number of the radius of curvature R1. As illustrated in FIG. 3, the radius of curvature R1 of the curved surface 113 is smaller than the radius of curvature R of the spherical surface 112. Thus, the curvature of the curved surface 113 (1/R1) becomes larger than the curvature of the spherical surface 112 (1/R).

The curvature of the curved surface 113 is not required to be fixed but may be varied at a certain position. Thus, the curved surface 113 is only required to satisfy the condition that the curvature of the curved surface 113 is larger than the curvature of the spherical surface 112.

The cover surface 114 continues from the upper end of the curved surface 113 to the flat surface 110. In this embodiment, the cover surface 114 is a horizontal flat surface. It is preferable that the cover surface 114 is a perfect flat surface. However, the cover surface 114 is not required to be a complete flat surface in view of manufacture and the like. Thus, a slightly curved cover surface is allowed as the cover surface 114 as long as the cover surface is considered as a flat surface on the whole.

The plural convexes 111 having these shapes are disposed in the up-down direction. In this arrangement, external light supplied to the convexes 111 from above at an incident angle in the range from 30 to 60 degrees with respect to the screen chiefly reaches the curved surfaces 113. As described above, the directions of the spherical surfaces 112 and the curved surfaces 113 can be determined according to the incident direction of the projection light and the incident direction of the external light having effect on the image formed by the projection light and displayed on the screen 1.

Each shape of the convexes 111 is discussed in more detail.

As illustrated in FIG. 3, each of the convexes 111 has a cross-sectional shape containing the center axis of the convex 111 in the left-right direction and crossing the flat surface 110 as a shape surrounded by points A through D. More specifically, the circular-arc curve between the points A and B is defined by the spherical surface 112, and the circular-arc curve between the points B and C is defined by the curved surface 113. Also, the straight line between the points C and D is defined by the cover surface 114, and the straight line between the points D and A is defined by a bottom surface 115 of the convex 111. The bottom surface 115 corresponds to the area on which the convex 111 is formed on the flat surface 110 of the screen 1.

As can be seen from the figure, the point A is the cross point of the bottom surface 115 of the convex 111 and the spherical surface 112, and the point B is the cross point of the spherical surface 112 and the curved surface 113. Also, the point C is the cross point of the curved surface 113 and the cover surface 114, and the point D is the cross point of the cover surface 114 and the bottom surface 115 of the convex 111. A point O is the center point of the spherical surface 112, and a point P is the center point of the curved surface 113.

When the center point of the spherical surface 112 is the point O, the curve between the points A and B is constituted by a circular-arc curve having the radius R. An angle formed by the points A, O and B, i.e., an angle <AOB is determined in the range from 80 to 90 degrees considering the incident direction of the projection light, the reflection characteristics and the like (a first constituent requirement).

The curve between the points B and C is constituted by a circular-arc curve having a curvature larger than that of the circular-arc curve between the points A and B. An angle formed by the point O as the center of the spherical surface 112 and the points B and C, i.e., an angle <OBC is determined in the range from 30 to 50 degrees considering the incident direction of the external light and the like (a second constituent requirement).

A distance L1 between the points O and D is set at a length equal to or smaller than the half of the radius R of the circular-arc curve between the points A and B (the sphere radius R of the spherical surface 112) (a third constituent requirement). It is preferable that the surface connecting the points C and D (the cover surface 114) is a horizontal surface as illustrated in the figure.

When each distance L2 between the adjoining convexes 111 disposed in the up-down direction is set at a constant length, a larger number of the convexes 111 can be provided in the vertical direction in case of the cover surfaces 114 constituted by horizontal surfaces than in case of the cover surface 114 constituted by inclined surfaces or curved surfaces. In this structure, each area of the spherical surfaces 112 on the reflection surface (reflection area) can be increased, and thus the screen gain can be more improved.

It is thus preferable that the cover surface 114 is formed by a horizontal surface. However, the cover surface 114 may be an inclined surface as long as all of the first through third constituent requirements are satisfied. When the cover surface 114 is inclined, the point D needs to be positioned higher than the point C such that the convex 111 can be removed from a mold at the time of manufacture. According to this embodiment, the cover surface 114 is a horizontal surface, and thus the distance L1 between the points O and D corresponds to a distance R1 between the points C and P.

When the cover surface 114 is inclined, the distance L1 between the points O and D is set at the distance R1 between the points C and P or longer so as not to undercut the cover surface 114. When the distance L1 between the points O and D is increased to enlarge the inclination angle of the cover surface 114, the intervals of the spherical surfaces 112 of the convexes 111 disposed in the up-down direction become longer. As a result, the reflection area decreases. In this case, the screen gain lowers. Thus, when the cover surface 114 is inclined, it is preferable that the distance L1 is set at ½ of the radius R or shorter.

The cover surface 114 is not required to be a flat surface but may be a curved surface. However, the cover surface 114 is so structured that the vertex of the curved surface (the cover surface 114) is not positioned above the point D and that the lowermost point of the curved surface corresponds to the point C so as not to undercut the cover surface 114. Thus, when the cover surface 114 is a curved surface, the curvature of the curved surface 114 becomes extremely small. Accordingly, the curved surface can be considered as a substantially flat surface.

The cover surface 114 having this structure is required so as to prevent difficulty in separation between the substrate 11 and a mold when the substrate 11 is shaped by transfer of the mold, and to separate the position of the convex 111 from the adjoining convex 111 positioned immediately above for prevention of interference from the spherical surface 112 positioned immediately above.

Accordingly, the convex 111 has a cross-sectional shape containing the center axis of the convex 111 in the left-right direction (the axial line connecting the points A, O, and D) and crossing the flat surface 110 as the shape surrounded by the points A through D. Thus, the three-dimensional shape of the convex 111 corresponds to a shape represented by a locus produced by rotating the area surrounded by the points A, B, C, and D on the cross section shown in FIG. 3 around the center axis (AOD) through 180 degrees.

As illustrated in FIG. 2, the plural convexes 111 are disposed two-dimensionally on the reflection surface of the substrate 11. While the respective convexes 111 are disposed in the form of a square grid pattern (vertical and horizontal grid pattern) in this embodiment as illustrated in the figure, the convexes 111 may be arrangement in other forms such as zigzag pattern (hexagonally dense pattern). It is preferable that the convexes 111 are disposed close to one another in view of improvement of the reflection area (area of the spherical surface 112) on the reflection surface. However, a flat portion may be provided between each adjoining pair of the convexes 111 as long as advantages described later are not affected in view of manufacture or the like.

According to this embodiment, the flat surface 110 having the height L2 is provided between each adjoining pair of the convexes 111 in the up-down direction as illustrated in FIG. 3.

As can be seen from FIG. 1, the reflection films 12 are formed on the spherical surfaces 112 of the convexes 111 on the substrate 11.

The material of each of the reflection films 12 may be any material as long as it has high reflectance. For example, the reflection films 12 are made of aluminum (Al), silver (Ag), and other metals. The reflection films 12 made of high-reflectance material can improve the screen gain. Though not shown in the figure, thin films such as protection films may be further provided on the surfaces on which the reflection films 12 are formed as necessary. Each thickness of the reflection films 12 is appropriately determined according to the film material and the type of the screen 1.

The reflection films 12 are provided on the spherical surfaces 112 of the convexes 111 in the areas directly receiving the projection light from the projector 2. The areas of the spherical surfaces 112 corresponding to the reflection films obtain extremely preferable light reflection characteristics compared with the substrate 11 by the function of the reflection films 12.

1-1-2. Use Condition of Screen

The use condition of the screen 1 is now explained.

As illustrated in FIG. 1, the screen 1 is disposed in such a direction that the reflection surface is substantially perpendicular to the installment surface for use. The projector 2 is positioned at a lower position in the front central area of the reflection surface such that the projection light can be projected to the vicinity of the central portion of the reflection surface of the screen 1. In this case, the observer observes the image projected on the screen 1 from the front of the reflection surface in the following condition.

The projector 2 supplies projection light to the reflection surface of the screen 1. The supplied projection light diagonally reaches the reflection surface of the screen 1 from below in the vertical direction. The projection light having reached the reflection surface of the screen 1 directly comes to the reflection films 12 on the spherical surfaces 112 of the convexes 111. Thus, the projection light can be efficiently reflected by the reflection films 12 on the spherical surfaces 112 toward a wide area in the front direction of the reflection surface. Accordingly, the observer can observe the image projected on the screen 1.

1-2. Screen Manufacturing Method

The method for manufacturing the screen 1 according to this embodiment is now explained.

Figure 5:
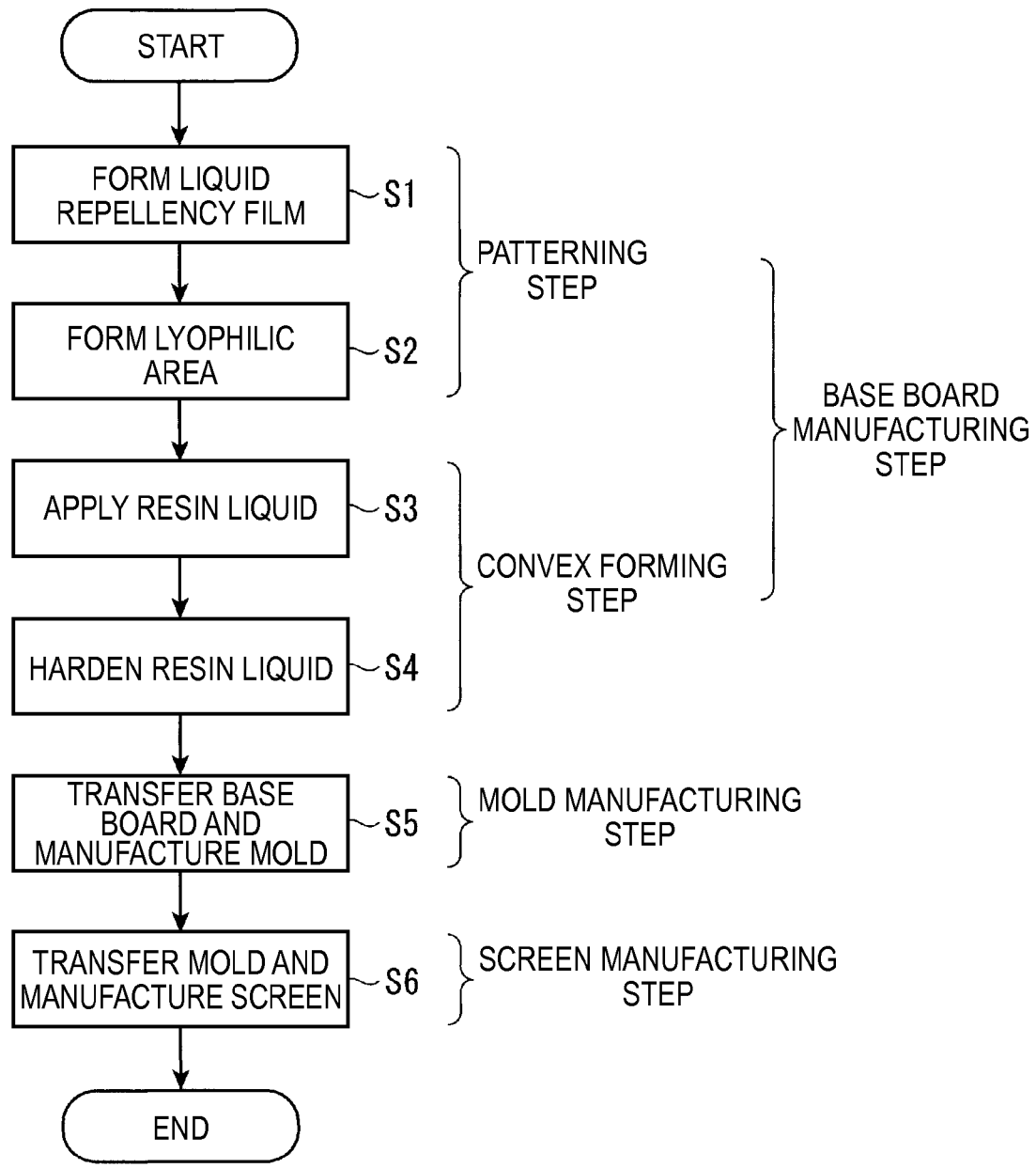
FIG. 5 is a flowchart showing a flow of processes performed in a screen manufacturing method.

FIG. 5 is a flowchart showing a flow of processes performed in the screen manufacturing method in this embodiment. As shown in FIG. 5, the screen manufacturing method according to this embodiment includes a base board manufacturing step for manufacturing a base board, a mold manufacturing step for manufacturing a mold, and a screen manufacturing step for manufacturing a screen performed in this order to produce the screen 1. The base board manufacturing step is divided into a patterning step and a convex forming step.

The screen 1 is manufactured by using a screen forming mold (abbreviated as mold) in the screen manufacturing step. This mold is manufactured by using a base board in the mold manufacturing step. The base board is molded in the base board manufacturing step. The base board manufacturing step, the mold manufacturing step, and the screen manufacturing step are herein explained in this order.

1-2-1. Base Board Manufacturing Step

FIGS. 6A through 6D are partial cross-sectional views illustrating the base board manufacturing step.

In the base board manufacturing step, the patterning step and the convex forming step are executed in this order. In the patterning step, a liquid repellency film forming process and a lyophilic area forming process are carried out in this order. In the convex forming step, a resin liquid applying process and a resin liquid hardening process are carried out in this order.

Figure 6A:
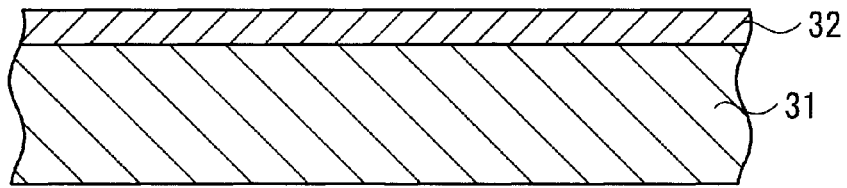
FIGS. 6A through 6D are partial cross-sectional views illustrating a base board manufacturing step.

In the liquid repellency film forming process, a liquid repellency film 32 is formed on one of plate surfaces (smooth surfaces) of the base board 31 prepared beforehand and prior to molding as illustrated in FIG. 6A (step S1).

The material of the base board 31 may be any material such as material typically used as a base board for a mold. It is preferable that the base board 31 is made of material not easily warped nor scratched. In addition, it is preferable that the base board 31 is made of material easily processed in the subsequent processes and available at low cost. The examples of the material of the base board 31 include various types of glass, metal, and resin such as plastic. For example, the base board 31 is made of blue plate glass in view of strength, processability, manufacturing cost and the like.

The forming material and applying method of the liquid repellency film 32 are not particularly limited similarly to the base board 31. For example, the liquid repellency film 32 may be organic film made of heat hardening type, light hardening type or other types of resin having liquid repellency such as fluororesin. Even when the liquid repellency film 32 is made of resin having low liquid repellency, the surface of the resin obtains liquid repellency by applying CF4 gas atmospheric pressure plasma to the surface, coating the surface with fluororesin, or by other methods. The material applying method may be a known method such as spin coating method, bar coating method, and self-organizing film forming method.

The lyophilic area forming process is performed subsequent to the liquid repellency film forming process.

Figure 6B:
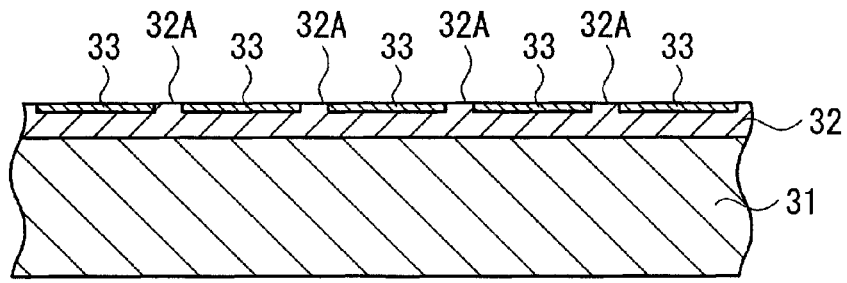

In the lyophilic area forming process, lyophilic areas 33 are formed on the liquid repellency film 32 provided on the base board 31 as illustrated in FIG. 6B (step S2). The lyophilic areas 33 have higher surface energy than that of the liquid repellency film 32. Thus, the lyophilic areas 33 and liquid repellency areas 32A having liquid repellency relative to the lyophilic areas 33 (areas not having the lyophilic areas 33) are patterned on the surface of the base board 31.

The lyophilic areas 33 can be produced by providing a mask corresponding to a predetermined pattern on the surface of the liquid repellency film 32 and applying exposure and development processes to the surface of the liquid repellency film 32. In this embodiment, each of the lyophilic areas 33 has a semicircular shape.

Figure 7:
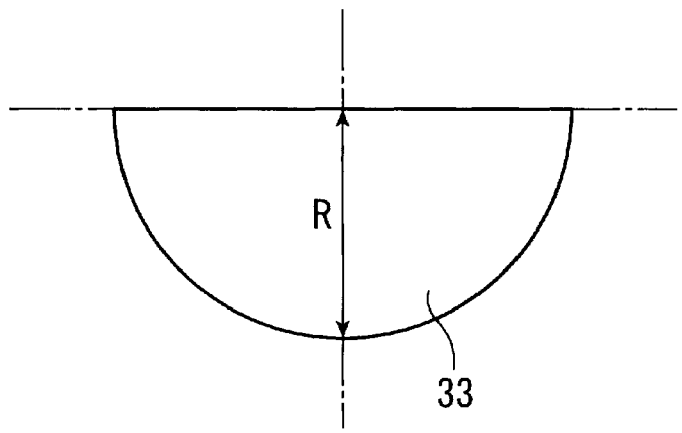
FIG. 7 illustrates a shape of a semicircular lyophilic area.

The shapes of the lyophilic areas 33 are now explained in detail. Each shape of the lyophilic areas 33 may be a perfect semicircular shape having the radius R as illustrated in FIG. 7, or may be a shape close to a semicircular shape. This is because the shape of the convexes 111 of the screen 1 as the finished product has an approximately ¼ spherical shape which is produced based on the convex raised from the lyophilic area 33 as the bottom surface in the following processes as described above.

FIG. 8A through 11B illustrate a specific example of the semicircular lyophilic area 33.

Figure 8A:
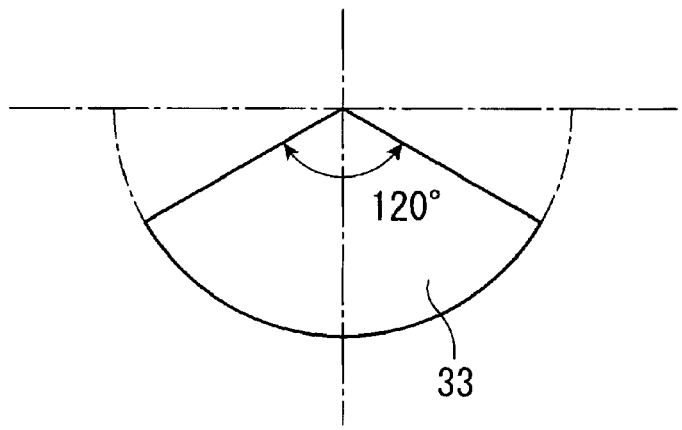
FIGS. 8A and 8B illustrate a specific example 1 of another shape of the semicircular lyophilic area.
Figure 8B:
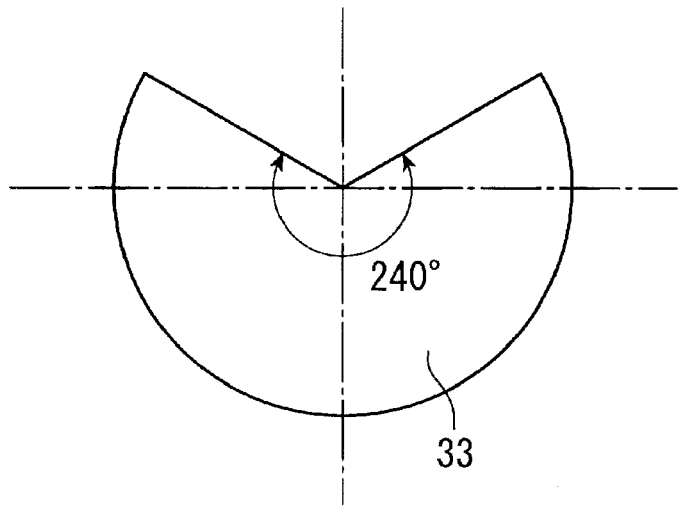

As illustrated in FIGS. 8A and 8B, the lyophilic area 33 may have a sectorical shape having the center angle in the range from 120 degrees (FIG. 8A) to 240 degrees (FIG. 8B), for example.

Figure 9A:
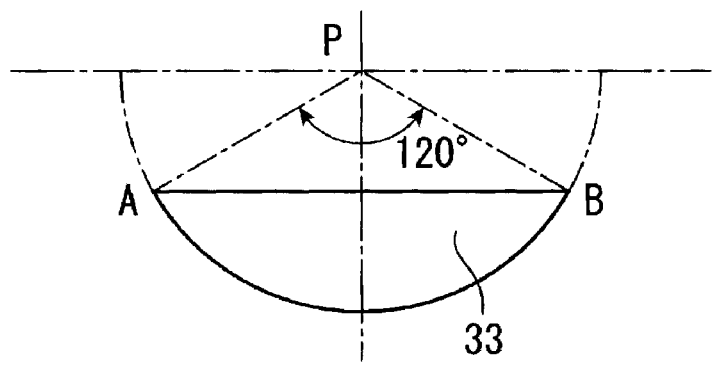
FIGS. 9A and 9B illustrate a specific example 2 of a further shape of the semicircular lyophilic area.
Figure 9B:
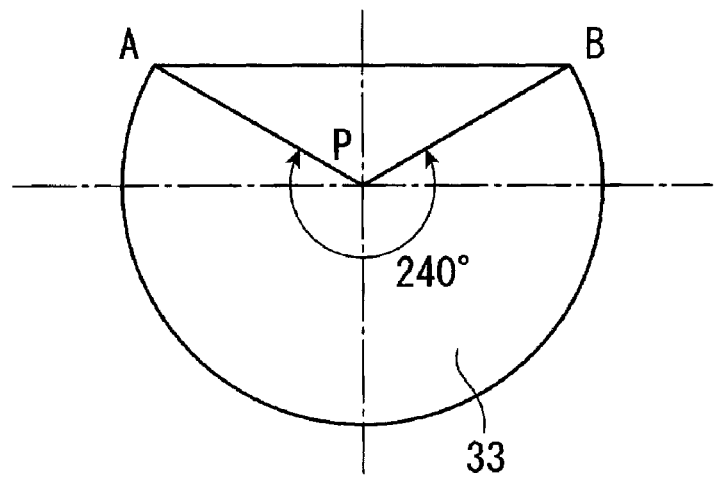

As illustrated in FIGS. 9A and 9B, the lyophilic area 33 may have a shape having an angle in the range from 120 degrees (FIG. 9A) to 240 degrees (FIG. 9B) as the angle formed by lines connecting both ends A and B of a circular-arc curve and a center point P of the circular-arc curve.

Figure 10A:
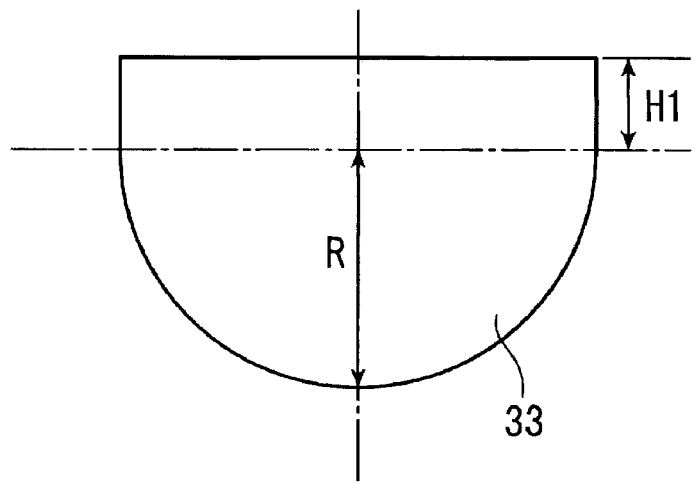
FIGS. 10A through 10C illustrate a specific example 3 of a still further shape of the semicircular lyophilic area.
Figure 10B:
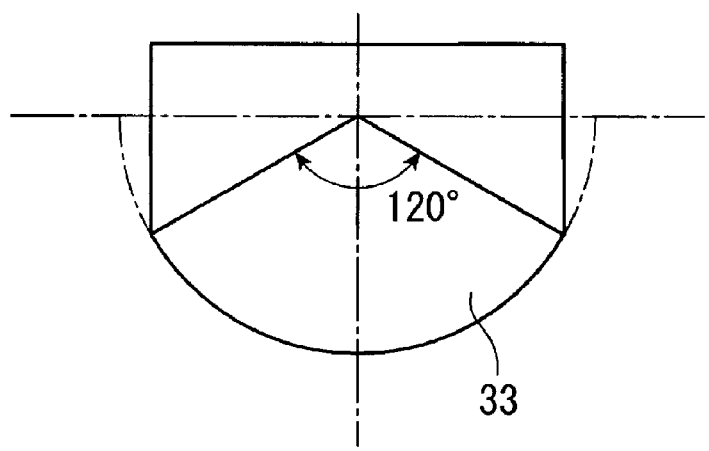
Figure 10C:
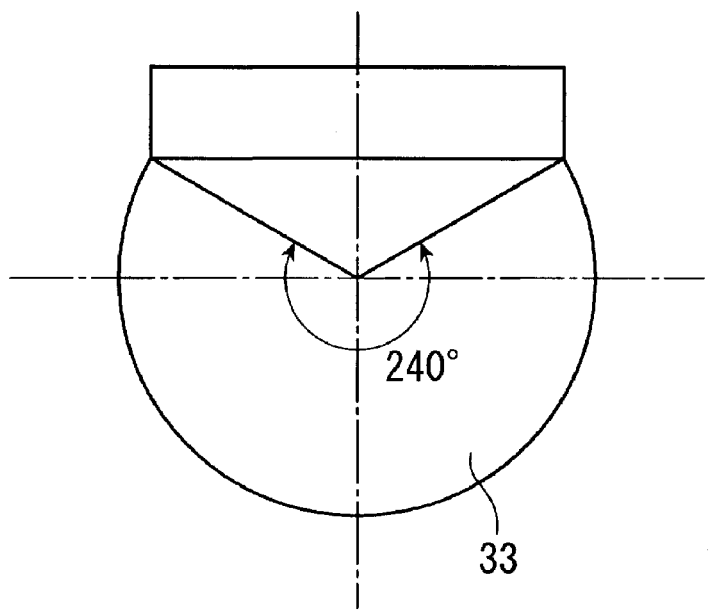

As illustrated in FIGS. 10A through 10C, the lyophilic area 33 may have a shape as a combination of a semicircular area defined by a circular-arc curve and a straight line and a rectangular area having a side corresponding to the straight line of the semicircular area. In this case, a height H1 of another side of the rectangle is smaller than $H1=R\times(½-\sin(\theta-180))$.

FIG. 10A illustrates a shape as a combination of a semicircular area defined by a circular-arc curve and a straight line and a rectangle having a side corresponding to the straight line of the semicircular area. FIG. 10B illustrates a shape as a combination of the shape shown in FIG. 9A and the rectangle combined in the similar manner. FIG. 10C illustrates a shape as a combination of the shape shown in FIG. 9B and the rectangle combined in the similar manner.

Figure 11A:
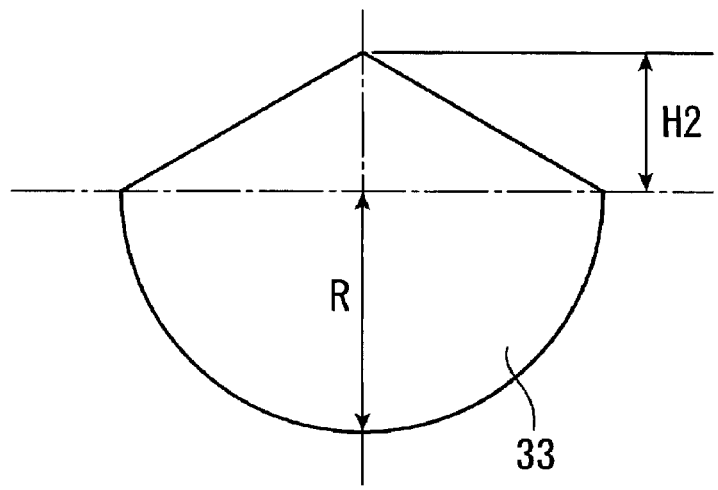
FIGS. 11A and 11B illustrate a specific example 4 of a still further shape of the semicircular lyophilic area.
Figure 11B:
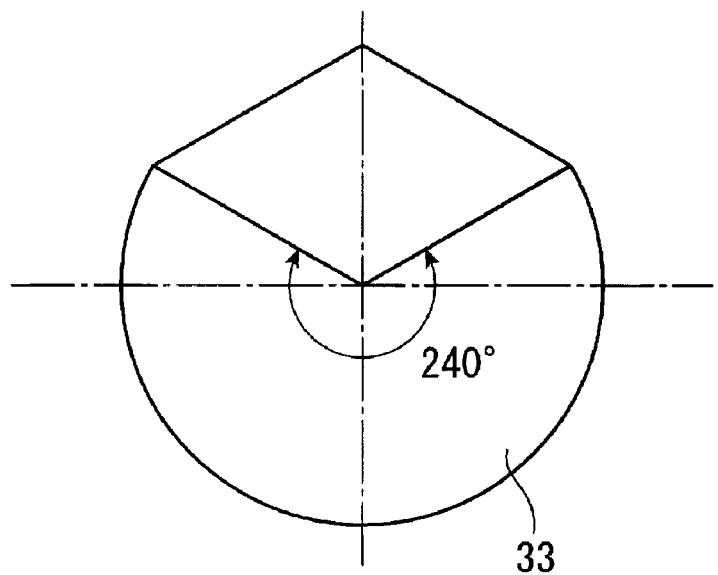

As illustrated in FIGS. 11A and 11B, the lyophilic area 33 may have a shape as a combination of a semicircular area defined by a circular-arc curve and a straight line and a triangular area having a side corresponding to the straight line of the semicircular area. In this case, a height H2 of the triangle is smaller than $H2=R\times(½-\sin(\theta-180))$.

FIG. 11A illustrates a shape as a combination of a semicircular area defined by a circular-arc curve and a straight line and a triangle having a side corresponding to the straight line of the semicircular area. FIG. 11B illustrates a shape as a combination of the shape shown in FIG. 9B and the triangle.

The shape to be combined may be other shapes such as trapezoidal shape. The lines for closing the circular-arc curve are not limited to straight lines but may be curves.

The forming method of the lyophilic areas 33 is not particularly limited. For example, the lyophilic areas 33 may be formed by micro-photographing the mask having the predetermined pattern using excima laser or other laser and ablating the resin of the liquid repellency film 32 to improve the surface.

The resin liquid applying process is carried out subsequent to the lyophilic area forming process.

Figure 6C:
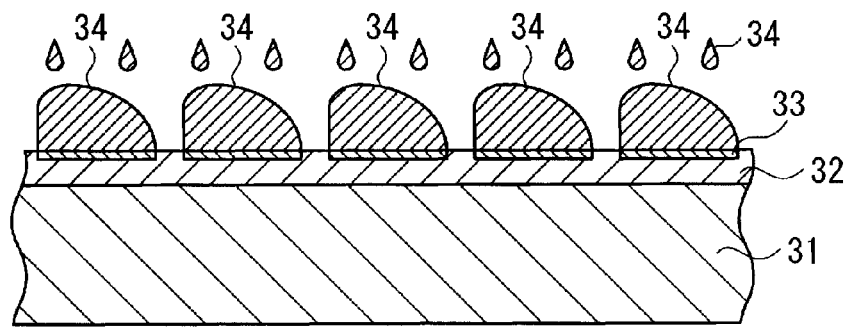

In the resin liquid applying process, resin liquid 34 is applied to the upper surfaces of the lyophilic areas 33 as illustrated in FIG. 6C (step S3). In this embodiment, the resin liquid is ultraviolet hardening resin, and is dropped to the surfaces to be applied thereto. The material of the resin liquid 34 may be any material as long as it can be applied to the upper surfaces of the lyophilic areas 33 and hardened thereon. In addition, the material of the resin liquid 34 is not limited to light hardening type resin such as ultraviolet hardening resin but may be heat hardening type resin or the like.

It is preferable that the resin liquid 34 is applied by a liquid drop delivering method such as ink jet method. When the liquid drop delivering method is used, the step for applying the resin liquid 34 can be facilitated, and also a highly accurate and clear pattern can be formed in a wide area by one step. The liquid amount to be applied is determined according to the size of the pattern of the lyophilic areas 33, the shapes of the convexes 111 on the manufactured screen 1 and the like.

When the delivery amount is small, the tangent at the point A on the circular-arc curve between the points A and B shifts from the horizontal direction on the cross section of the convex 111 on the manufactured screen 1 (see FIG. 3), and comes to be inclined upward in the projection direction. As a result, the shape of the convex 111 becomes a shape crashed from above.

When the delivery amount is too large, the resin liquid 34 flows from the lyophilic areas 33. As a result, the predetermined pattern cannot be formed. Even when the resin liquid 34 does not flow from the lyophilic areas 33, there is a possibility that an angle α formed by the tangent becomes an obtuse angle (the tangent is inclined downward in the projection direction in FIG. 3). In this case, the mold formed by transferring this shape cannot be separated or cannot be easily separated at the time of manufacture of the mold in the subsequent steps. Thus, the liquid amount needs to be adjusted such that the angle α formed by the tangent becomes 90 degrees or smaller (the tangent is directed horizontal or inclined upward in the projection direction).

The distance L1 between the points O and D is determined by the surface tension of the delivered resin liquid 34. When the distance L1 is long, the position of the point B as the vertex shifts upward in FIG. 3. In this case, the curvature of the curved surface 113 increases in accordance with the shift of the point B, and the angle formed by the points O, B, and C becomes close to a right angle. When the distance L1 is 0, the point B shifts downward. In this case, the reflection surface cannot be appropriately formed.

Experiments have confirmed that the length of the distance L1 is preferably ¼R (¼ of the radius R of the spherical surface 112) or larger and smaller than ½R (½ of the radius R of the spherical surface 112). When the distance L1 is ½R or larger, the area of the spherical surface 112 decreases and produces an undesirable condition.

Figure 6D:
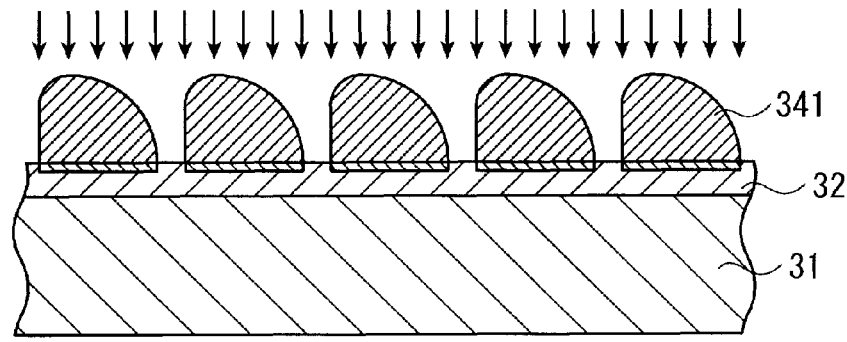

By applying the resin liquid 34 under these requirements, the resin liquid 34 grows as illustrated in FIG. 6D while affected by the liquid repellency areas 32A. As a result, convexes 341 having desired shapes can be formed.

In this embodiment, the radius R1 of the curved surface 113 is equivalent to the distance L1. Thus, the radius R1 is similarly determined in the range from ¼ of the radius R to ½ of the radius R.

The resin liquid hardening process is carried out subsequent to the resin liquid applying process.

In the resin liquid hardening process, the applied resin liquid 34 is hardened (step S4). In this embodiment, the resin liquid 34 is made from ultraviolet hardening type resin material, and ultraviolet radiation (UV radiation) process is chiefly performed as the hardening process as illustrated in FIG. 6D. By this method, the convexes 341 constituted by the resin liquid 34 are formed on the base board 31. Thus, the convexes 341 can be easily and securely formed by applying ultraviolet light to the liquid drops of the resin liquid 34. The convexes 341 correspond to the base shapes of the convexes 111 on the manufactured screen 1.

When the resin liquid 34 made from heat hardening type resin material is used, the convexes 341 are formed on the base board 31 by performing heat (heating) process as the hardening process. In this case, the convexes 341 can be easily and securely formed by applying the heat process to the liquid drops of the resin liquid 34.

By these steps, the base board 31 which has the convexes 341 constituted by the raised resin liquid 341 on the semicircular lyophilic areas 33 on one of the plate surfaces can be produced. Since the convexes 341 are formed by raising the resin liquid 34, the contours of the convexes 341 become curved surfaces. Thus, the curved surfaces of the convexes 341 corresponding to the curved surfaces 113 of the screen 1 as the finished product can be produced by dropping and hardening the resin liquid 34 in an appropriate manner on the lyophilic areas 33 having any of the shapes described above.

1-2-2. Mold Manufacturing Step

The mold manufacturing step is now explained.

Figure 12A:
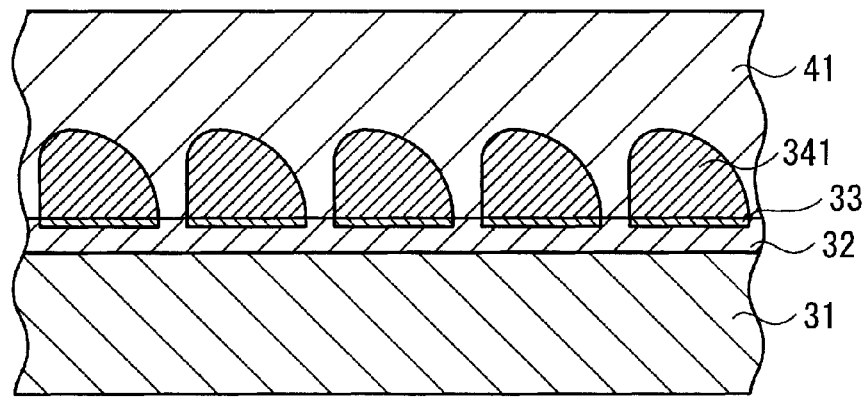
FIGS. 12A through 12C are partial cross-sectional views illustrating a mold manufacturing step.
Figure 12B:
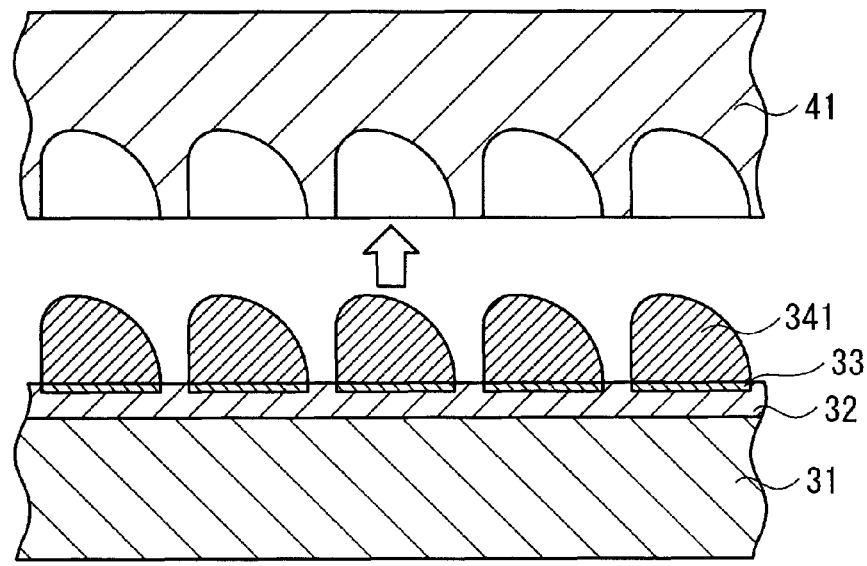
Figure 12C:
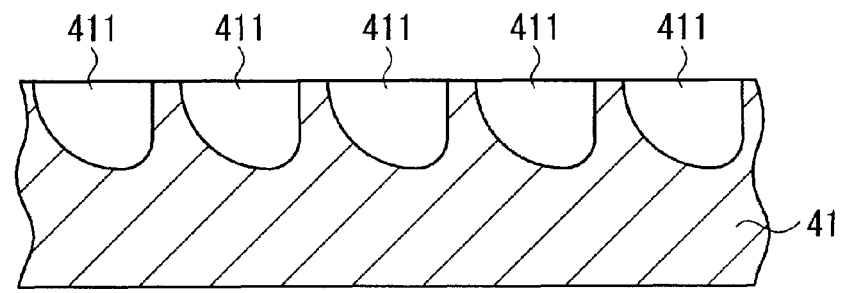

FIGS. 12A through 12C are partial cross-sectional views illustrating the mold manufacturing step.

In the mold manufacturing process, a mold forming process is initially carried out.

In the mold forming process, the transfer surface of the base board 31 (surface on which the convexes 341 are formed) formed by the base board manufacturing process is transferred to shape a mold 41 as illustrated in FIG. 12A.

The material of the mold 41 is not particularly limited. For example, material generally used as a mold can be employed. It is preferable that the mold 41 is made of material not easily warped nor scratched. In addition, it is preferable that the mold 41 is made of material easily processed in the subsequent processes and available at low cost. The examples of the material of the base board 31 include various types of glass, metal, and resin such as plastic.

Furthermore, it is preferable that the mold 41 is made of material easily released from the base board 31. When material having high adhesion is selected, mold release agent or other mold release process is applied to the transfer surface of the base board 31. By this method, transfer can be performed in a preferable manner.

The thickness of the mold 41 may be any length as long as the length is sufficient for use as a mold.

The transfer method for transferring the transfer surface of the base board 31 is not particularly limited but may be selected from various methods according to the materials or the like of the base board 31 and the mold 41. For example, transfer by 2P method, and transfer by electroforming using nickel (Ni) or other conductive material may be employed. For example, Ni film having a thickness in the range from 80 to 150 nm is formed by Ni sputtering or electroless plating. Then, Ni film having a thickness in the range from 500 to 1,000 μm is formed by Ni electroforming. By separation along the Ni surface, an Ni stamper is produced. By using this stamper, a replica (the substrate 11) can be manufactured by 2P or thermal press.

A mold releasing process is carried out subsequent to the mold forming process.

In the mold releasing process, the mold 41 formed by the mold forming process is released from the base board 31 as illustrated in FIG. 12B.

By these steps, the mold 41 having concaves 411 produced by transferring the convexes 341 to one of the plate surfaces of the mold 41 is manufactured as illustrated in FIG. 12C (step S5).

1-2-3. Screen Manufacturing Step

The screen manufacturing step is now explained.

FIGS. 13A through 13D are partial cross-sectional views illustrating the screen manufacturing step.

In the screen manufacturing step, a substrate forming process is initially carried out.

Figure 13A:
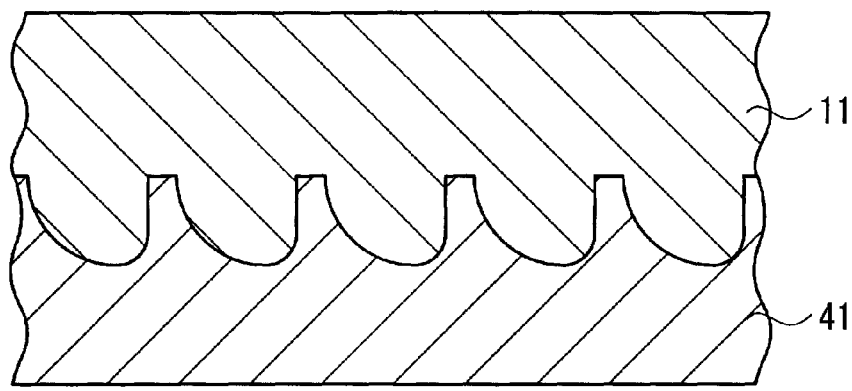
FIGS. 13A through 13D are partial cross-sectional views illustrating a screen manufacturing step.

In the substrate forming process, the substrate 11 is formed by transferring the transfer surface of the mold 41 (surface having the concaves 411) manufactured by the mold manufacturing process to the substrate 11 as illustrated in FIG. 13A.

It is preferable that the material and the like of the substrate 11 are determined considering easiness of separation from the mold 41 as explained in "1-1-1. Structure of Screen". When material having high adhesion is selected, mold release agent or other mold release process is applied to the transfer surface of the mold 41. By this method, transfer can be performed in a preferable manner.

The transfer method of the mold surface of the mold 41 is not particularly limited but may be arbitrarily selected according to the material and the like of the mold 41 and the substrate 11 similarly to the base board 31. For example, transfer by 2P method and thermal transfer may be employed.

A substrate releasing process is carried out subsequent to the substrate forming process.

Figure 13B:
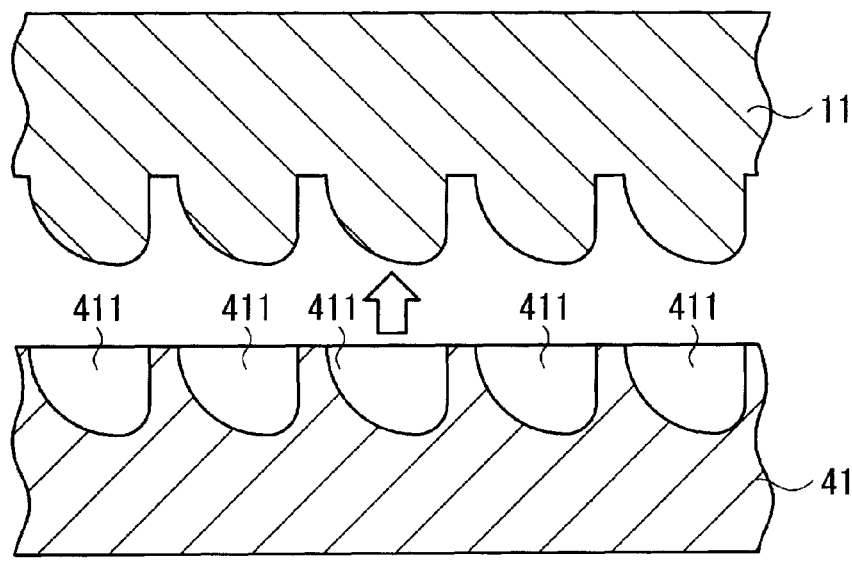

In the substrate releasing process, the substrate 11 formed by the substrate forming process is released from the mold 41 as illustrated in FIG. 13B.

Figure 13C:
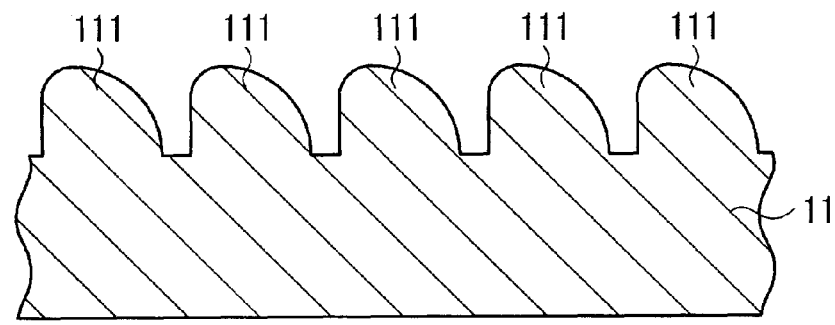

By this step, the substrate 11 having the convexes 111 on one of the surfaces illustrated in FIG. 13C is manufactured. The substrate 11 is produced by transferring the transfer surface of the mold 41 to the substrate 11. The mold 41 is produced by transferring the transfer surface of the base board 31 to the mold 41. Thus, the shapes of the convexes 111 of the substrate 11 are similar to the shapes of the convexes 341 of the base board 31.

A reflection film forming process is carried out subsequent to the substrate release process.

In the reflection film forming process, the reflection films 12 are formed on the spherical surfaces 112 of the convexes 111 of the substrate 11.

The structure of the reflection films 12 such as the material has been discussed in "1-1-1. Structure of Screen", and the same explanation is not repeated.

The forming method of the reflection films 12 is not particularly limited but may be arbitrarily selected according to the materials and the like of the substrate 11 and the reflection films 12. For example, the reflection films 12 may be formed by deposition, spray coating which applies coating containing aluminum powder, or printing.

According to this embodiment, the reflection films 12 are formed by deposition method which deposits reflection film material in an oblique direction such that the reflection films 12 can be formed on the spherical surfaces 112 in accordance with the incident direction of the projection light. The reflection films 12 can be adequately formed in the areas of the spherical surfaces 112 directly receiving the projection light by setting the angle of deposition at an appropriate angle according to the incident direction of the projection light, the facing direction of the spherical surfaces 112 and the like. According to the example shown in the figure, the reflection films 12 are deposited from the upper left in correspondence with the facing direction of the spherical surfaces 112. By this method, the reflection films 12 can be formed on the spherical surfaces 112 produced based on the semicircular shapes described above.

When each of the reflection films 12 is formed by deposition method in the oblique direction, the thickness of the reflection film 12 gradually becomes smaller toward the outer periphery of the side not having the reflection film 12.

When the reflection films 12 are formed by deposition method, the reflection films 12 become thinner and higher quality films than those formed by spray coating, printing or other methods.

Finally, thin films such as protection films (not shown) are formed on the reflection films 12 as necessary.

Figure 13D:
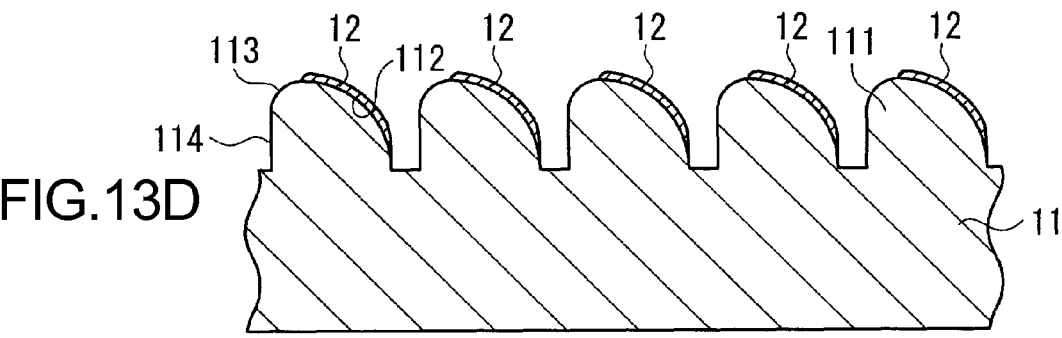

By these steps, the screen 1 having the convexes 111 formed on the one surface and the reflection films 12 formed on the spherical surfaces 112 of the convexes 111 is manufactured as illustrated in FIG. 13D (step S6).

1-3. Advantages of First Embodiment

As described above, the screen 1 according to this embodiment of the invention includes the curved surfaces 113 having larger curvature than that of the spherical surfaces 112 having ¼ spherical shapes along the ends of the spherical surfaces 112. Thus, the entire shapes become smaller than semispherical convexes having the same radius. Moreover, the plural convexes 111 having light reflection characteristics are regularly disposed adjacent to each other on the reflection surface. More specifically, the projection light is diagonally supplied to the screen 1 from below in the central front region of the screen 1, and thus the spherical surfaces 112 are directed downward in the vertical direction. Since the spherical surfaces 112 have light reflection characteristics, the projection light can be reflected by the spherical surfaces 112 toward the front in a well-balanced manner. Since the entire shape of each of the convexes 111 is smaller than that of the semispherical convex, the area of the spherical surface 112 directly receiving the projection light becomes larger than that area of the semispherical convex disposed adjacent to each other. As a result, the screen gain considerably improves.

The external light supplied in a direction (chiefly from above) different from the incident direction of the projection light (from below in the vertical direction) and having serious effect on the screen characteristics is reflected and diffused by each of the curved surface 113 disposed along the end of the spherical surface 112. Thus, the reflected external light does not reach the spherical surface 112 of the convex 111 positioned immediately above in the direction corresponding to the incident direction of the external light to be further reflected thereby. As a result, the contrast enhances.

According to the cross-sectional shape shown in FIG. 3, the angle formed by the points A, O, and B lies in the range from 80 degrees to 90 degrees. When the angle is smaller than 80 degrees, the area of the spherical surface 112 decreases and affects the reflection characteristics of the spherical surface 112. When the angle is larger than 90 degrees, the positions of the curved surfaces 113 shift and affect reflection of the external light by the curved surfaces 113. When the angle lies within this range, the improvements of the screen gain by the spherical surfaces 112 and the improvement of the contrast by the curved surfaces 113 become preferable.

According to the cross-sectional shape shown in FIG. 3, the angle formed by the points O, B, and C of the curved surface lies in the range from 30 degrees to 50 degrees. When the angle is smaller than 30 degrees, a large amount of the light reflected by the curved surface 113 reaches the spherical surface 112 of the adjoining convex 111 disposed in the direction corresponding to the incident direction of the external light and affects the contrast. When the angle is larger than 50 degrees, a large amount of the light is reflected by the curved surface 113 toward the front of the reflection surface and affects the contrast. When the angle lies within this range, the enhancement of the contrast by the curved surface 113 becomes preferable.

When the distance between the points O and D is ½ of the sphere radius R of the spherical surface 112 or shorter in the cross-sectional shape shown in FIG. 3 with the cover surface 114 constituted by a horizontal surface, the convexes 111 can be disposed at short intervals. In this case, the areas of the spherical surfaces 112 (reflection areas) on the reflection surface increase, and thus the screen gain improves.

According to the screen manufacturing method in this embodiment, the resin liquid 34 is applied to the lyophilic areas 33 surrounded by the liquid repellency areas 32A and hardened thereon. Thus, the convexes 341 raised on the lyophilic areas 33 and having curved surface shapes can be formed. Then, the mold 41 having the concaves 411 produced by transferring the base board 31 having the convexes 341 to the mold 41 is transferred to the substrate 11 to manufacture the screen 1. Thus, the convexes 111 having shapes other than the semispherical shapes in correspondence with the shapes of the lyophilic areas 33 can be easily formed on the reflection surface of the screen 1.

In the patterning step, the lyophilic areas 33 have semicircular shapes. Thus, the convexes 341 raised on the semicircular lyophilic areas 33 and having curved surfaces (spherical surfaces) can be easily formed.

In the screen manufacturing step, the reflection films 12 are provided on the spherical surfaces 112 formed based on the semicircular shapes. Thus, the spherical surfaces 112 obtain light reflection characteristics.

Accordingly, the screen 1 can be easily manufactured.

2. Second Embodiment

A second embodiment is different from the first embodiment in that the lyophilic areas 33 contact each other by a predetermined length in a predetermined direction in the manufacturing step, that is, the convexes 111 of the screen 1 as the finished product connect each other by a predetermined length in a predetermined direction. Other points are similar to those in the first embodiment. It is considered that the constituent parts of the second embodiment similar to those of the first embodiment can be modified in the same manner as in the modified examples of the first embodiment.

2-1. Lyophilic Area

Figure 14:
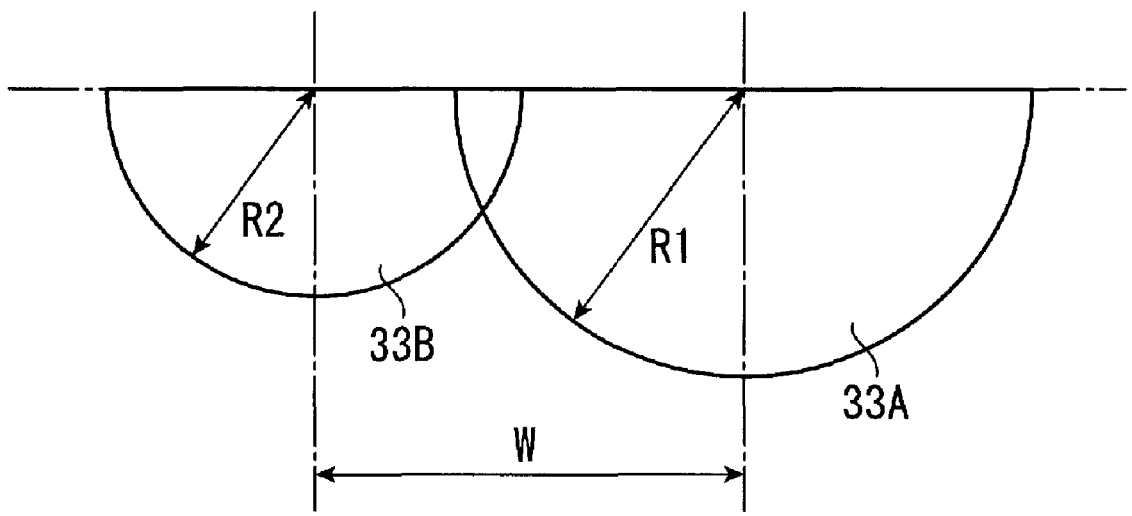
FIG. 14 illustrates shapes of lyophilic areas according to a second embodiment.

FIG. 14 illustrates the shapes of the lyophilic areas 33 forming the convexes 111 according to this embodiment. The lyophilic areas 33 in this embodiment include semicircular lyophilic areas 33A and 33B disposed adjacent to each other in the horizontal direction and contacting each other by a predetermined length. A radius R1 of a circular-arc curve of the lyophilic area 33A is different from a radius R2 of a circular-arc curve of the lyophilic area 33B.

It is preferable that a distance W between the centers of the respective circular-arc curves of the lyophilic areas 33A and 33B lies in the range from W=¾(R1+R2) to W=⁵⁄₄(R1+R2) in view of maintenance of the preferable shape of the connecting portion and enlargement of the reflection area. When the distance W is shorter than ¾(R1+R2), the overlapping portion of the lyophilic areas 33A and 33B increases and makes it difficult to maintain the shapes of the convexes 111 formed on the lyophilic areas 33A and 33B. When the distance W is longer than ⁵⁄₄(R1+R2), the lyophilic areas 33A and 33B are positioned away from each other. In this case, the number of the convexes 111 per unit area lowers, and thus the reflection area decreases. It is thus preferable that the distance W lies within this range.

2-2. Advantages of Second Embodiment

According to the second embodiment, the advantages similar to those of the first embodiment can be offered. Moreover, the pitch of the convexes 111 in the horizontal direction is reduced, and thus the reflection area of the central portions of the spherical surfaces 112 suited for reflection of the projection light toward the front can be increased.

Since the radii of the lyophilic areas 33A and 33B adjacent to each other are different, the small-diameter lyophilic areas 33B can be disposed between the large-diameter lyophilic areas 33A. Thus, the reflection area can be more effectively enlarged by utilizing the spaces between the lyophilic areas 33A.

3. Modified Examples

The invention is not limited to the embodiments described herein but may be practices otherwise. For example, while the screen suitable for the close projection type projector which projects projection light from below in the vertical direction has been discussed in the embodiments, the invention is applicable to a screen or the like suitable for a projector which projects from above, or for a projector of not close projection type but of normal projection distance type.

While the surface characteristics of the curved surfaces 113 and the cover surfaces 114 have not been touched upon in the embodiments, the curved surfaces 113 and the cover surfaces 114 may have light absorption characteristics. When the surfaces 113 and 114 have light absorption characteristics, reflection of the external light by the curved surfaces 113 can be prevented. Accordingly, reflection of the external light by the adjoining convexes 111 can be further securely avoided, and thus the contrast can be further enhanced.

The light absorption characteristics can be provided by using light absorption material for the substrate 11, coloring the surfaces 113 and 114 in black by paint or the like prior to formation of the reflection films 12, or by other methods.

The spherical surfaces 112 are not required to obtain light reflection characteristics by forming the reflection films 12 but may obtain light reflection characteristics by using material having light reflection characteristics for the material of the substrate 11. In this case, it is preferable that the curved surfaces 113 and the cover surfaces 114 have light absorption characteristics after molding.

According to the embodiments, the respective areas of the spherical surfaces 112, the curved surfaces 113, and the cover surfaces 114 are clearly sectioned and formed as explained in the description of the structure of the convexes 111. However, the boundaries between these sections may be successively varied such that the first through third constituent requirements can be satisfied.

According to the method for manufacturing the screen 1 in the embodiments, the mold 41 is produced by transferring the base board 31 to the mold 41, and the substrate 11 is formed by transferring the obtained mold 41 to the substrate 11 to manufacture the screen 1. However, the method for manufacturing the screen 1 may be other method as long as it can form the convexes 111 of the substrate 11 in correspondence with the shapes of the convexes 341 of the base board 31. For example, the screen 1 may be manufactured by using the base board 31 as the substrate 11, or by forming the substrate 11 using a mold produced by further repeating transfer of concaves and convexes.

According to the embodiments, the convexes 111 are provided on one of the surfaces of the screen 1 as the reflection surface. However, the reflection surface may be provided on both surfaces. In this case, the directions or the like of the convexes 111 on one surface may be different from those on the other surface. By this method, one screen can be applied to various use environments.

According to the embodiments, the reflection films 12 are formed on the spherical surfaces 112. However, light can be reflected by the spherical surfaces 112 without using the reflection films 12. In this case, the substrate forming the convexes 111 is made of material having preferable reflection characteristics.

Figure 15:
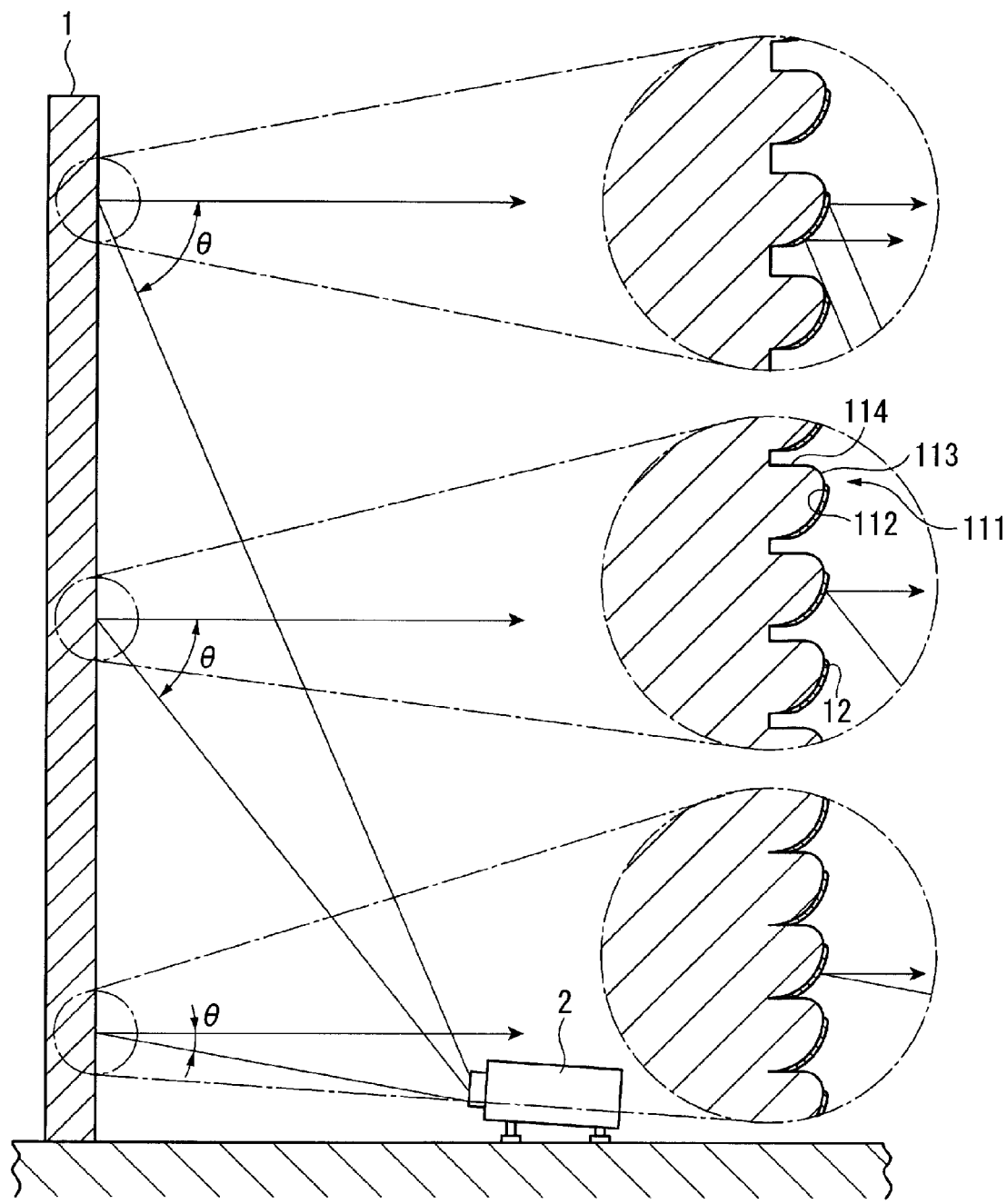
FIG. 15 illustrates the structure of an image projection system according to a modified example.

According to the first embodiment, the distance L2 between each adjoining pair of the convexes 111 disposed in the up-down direction is a constant length. However, the distance L2 may be varied according to the positions of the convexes 111 as illustrated in FIG. 15. For example, when the projector 2 is disposed at a lower position of the screen 1, an incident angle θ of light projected from the projector 2 and reaching the screen 1 increases from the lower end to the upper end of the screen 1. The distance L2 between the respective convexes 111 is set at a small value such as "0" in the lower region, and the distance L2 between the respective convexes 111 is enlarged toward the upper region of the screen 1 in accordance with the incident angle θ.

In this case, the distance L2 is varied within the range from "0" to the distance L1. For example, the space between the convexes 111 is not left in the lower region of the screen 1 shown in FIG. 15, and thus the distance L2 becomes "0". However, the distance L2 between the convexes 111 in the upper region of the screen 1 is set at the distance L1 as the length between the points O and D shown in FIG. 3. When the distance L2 between the convexes 111 is larger than L1, the convexes 111 are located at large intervals. In this case, the number of the convexes 111 to be provided decreases, and thus the screen gain lowers. Thus, the distance L2 between the convexes 111 is determined considering conditions such as the limitation to manufacture and the screen gain.

Figure 16:
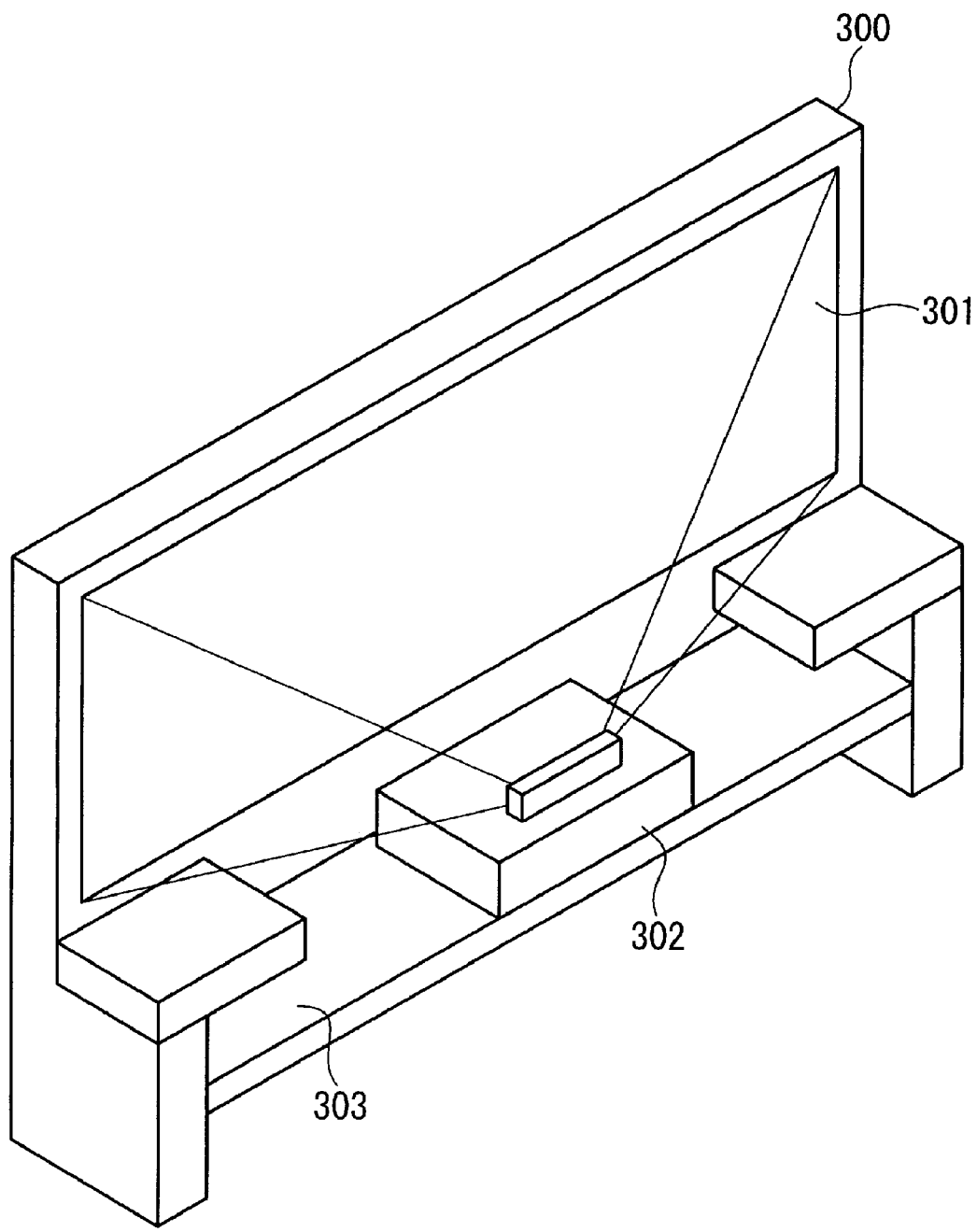
FIG. 16 is a perspective view illustrating a front projection television receiver according to another modified example.

The screen 1 according to the invention is not limited to the type included in the projection system shown in FIG. 1. For example, the invention is applicable to a front projection television receiver 300 including a screen 301 according to the invention, a projector 302 as a projection unit, and a frame 303 which is a housing for supporting these units as shown in FIG. 16.

CROSS-REFERENCE TO RELATED APPLICATIONS

The entire disclosure of Japanese Patent Application No. 2009-145045, filed Jun. 18, 2009 and 2010-064037, filed Mar. 19, 2010 are incorporated by reference herein.

What is claimed is:

1. A screen comprising:
a reflection surface which reflects projection light, the reflection surface including a plurality of convexes disposed thereon that each include a spherical surface having a ¼ spherical shape, a curved surface having curvature larger than curvature of the spherical surface and disposed along an end of the spherical surface, and a cover surface having a flat surface shape and disposed at an end of the curved surface,
wherein the convexes project from a flat surface extending along the reflection surface; and
when a point A as a cross point of the spherical surface and the flat surface, a point B as a cross point of the spherical surface and the curved surface, a point C as a cross point of the curved surface and the cover surface, a point D as a cross point of the cover surface and the flat surface, and a point O as the center point of the spherical surface are provided in a cross-sectional shape extending in a first direction where the spherical surface, the curved surface, and the cover surface of each of the convexes are disposed, crossing the flat surface at a right angle, and passing the center of the convex in a second direction perpendicular to the first direction, a circular arc having a radius R between the points A and B, a circular arc having a radius R1 shorter than the radius R between the points B and C, a straight line between the points C and D, and a straight line passing the point O between the points D and A are formed.

2. The screen according to claim 1, wherein a reflection film having higher light reflection characteristics than light reflection characteristics of the spherical surface is provided on each of the spherical surfaces.

3. The screen according to claim 1, wherein
when the distance between the points D and O is a distance L1, the distance L1 lies in the range from ¼ of the radius R to ½ of the radius R.

4. The screen according to claim 3, wherein
when the distance between each adjoining pair of the plural convexes disposed in the first direction is a distance L2, the distance L2 lies in the range from 0 to the distance L1.

5. The screen according to claim 4, wherein
when the first direction extends from the spherical surface of each of the convexes as the upstream side to the curved surface as the downstream side, the distance between each adjoining pair of the convexes disposed on the upstream side in the first direction is smaller than the distance between each adjoining pair of the convexes disposed on the downstream side in the first direction.

6. A projection system comprising:
the screen according to claim 1; and
a projector which projects light on the spherical surfaces of the convexes of the screen.

7. A front projection television receiver comprising:
the screen according to claim 1;
a projection unit which projects light on the spherical surfaces of the convexes of the screen; and
a housing which accommodates the screen and the projection unit.

8. A method for manufacturing a screen which reflects projection light by a reflection surface, comprising:
forming a substrate which includes a plurality of convexes each including a spherical surface having a ¼ spherical shape, a curved surface having curvature larger than curvature of the spherical surface and disposed along an end of the spherical surface, and a cover surface having a flat surface shape and disposed at an end of the curved surface; and
forming a reflection film on the spherical surface of each of the convexes to manufacture the screen,
wherein the convexes project from a flat surface extending along the substrate; and
when a point A as a cross point of the spherical surface and the flat surface, a point B as a cross point of the spherical surface and the curved surface, a point C as a cross point of the curved surface and the cover surface, a point D as a cross point of the cover surface and the flat surface, and a point O as the center point of the spherical surface are provided in a cross-sectional shape extending in a first direction where the spherical surface, the curved surface, and the cover surface of each of the convexes are disposed, crossing the flat surface at a right angle, and passing the center of the convex in a second direction perpendicular to the first direction, a circular arc having a radius R between the points A and B, a circular arc having a radius R1 shorter than the radius R between the points B and C, a straight line between the points C and D, and a straight line passing the point O between the points D and A are formed.

* * * * *